US011049184B1

(12) United States Patent
Hecht et al.

(10) Patent No.: US 11,049,184 B1
(45) Date of Patent: Jun. 29, 2021

(54) SYSTEMS AND METHODS FOR PROCESSING MULTI-PARTY INSURANCE CLAIM PAYOUTS

(71) Applicant: Wells Fargo Bank, N.A., San Francisco, CA (US)

(72) Inventors: Alan W. Hecht, Chanhassen, MN (US); Millicent Calinog, Park City, UT (US); Deborah L. Canale, Scottsdale, AZ (US); Imran Haider, San Ramon, CA (US); Laura Lee Orcutt, Chanhassen, MN (US); Erik Pilz, San Francisco, CA (US); Brad Stewart, Danville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 310 days.

(21) Appl. No.: 15/685,873

(22) Filed: Aug. 24, 2017

Related U.S. Application Data

(60) Provisional application No. 62/380,134, filed on Aug. 26, 2016.

(51) Int. Cl.
*G06Q 40/08* (2012.01)
*G06Q 20/10* (2012.01)
*G06Q 10/00* (2012.01)
*G06Q 30/02* (2012.01)

(52) U.S. Cl.
CPC .............. *G06Q 40/08* (2013.01); *G06Q 10/20* (2013.01); *G06Q 20/10* (2013.01); *G06Q 30/0283* (2013.01)

(58) Field of Classification Search
None
See application file for complete search history.

(56) References Cited

U.S. PATENT DOCUMENTS

| 2002/0035488 | A1* | 3/2002 | Aquila | G06Q 50/24 705/4 |
| 2009/0171822 | A1* | 7/2009 | Meadow | G06Q 40/025 705/30 |
| 2013/0226624 | A1* | 8/2013 | Blessman | G06Q 40/08 705/4 |
| 2013/0262156 | A1* | 10/2013 | Ketzef | G06Q 40/08 705/4 |
| 2014/0278576 | A1* | 9/2014 | Mariyal | G06Q 20/22 705/4 |

(Continued)

OTHER PUBLICATIONS

Lerner, Can mortgage lenders hold your insurance money hostage?, Aug. 29, 2012, HSH.com, entire document pertinent, retrieved from https://www.nasdaq.com/article/can-mortgage-lenders-hold-your-insurance-money-hostage-cm168251 (Year: 2012).*

*Primary Examiner* — Elda G Milef
*Assistant Examiner* — Gregory S Cunningham, II
(74) *Attorney, Agent, or Firm* — Foley & Lardner LLP

(57) ABSTRACT

Systems, methods, and apparatuses for processing multi-party insurance claim payouts are provided. A method includes receiving, by a processing circuit, an electronic insurance claim payment request based on an insurance claim regarding an insured entity; evaluating, by the processing circuit, the electronic insurance claim payment request; and facilitating, by the processing circuit, a dispersal of an amount of funds based on the electronic insurance claim payment request to the insured entity.

24 Claims, 8 Drawing Sheets

(56) References Cited

U.S. PATENT DOCUMENTS

| | | | |
|---|---|---|---|
| 2014/0351128 A1* | 11/2014 | Chou | G06Q 20/10 |
| | | | 705/44 |
| 2015/0154712 A1* | 6/2015 | Cook | G06Q 40/08 |
| | | | 705/4 |
| 2017/0116669 A1* | 4/2017 | Wickstrom | G06Q 10/1097 |
| 2017/0161693 A1* | 6/2017 | Hewson | G06Q 20/02 |
| 2018/0039990 A1* | 2/2018 | Lindemann | G06F 21/31 |

* cited by examiner

SYSTEMS AND METHODS FOR PROCESSING MULTI-PARTY INSURANCE CLAIM PAYOUTS

CROSS-REFERENCE TO RELATED APPLICATION

This application claims priority to U.S. Provisional Patent Application No. 62/380,134 entitled "SYSTEMS AND METHODS FOR PROCESSING MULTI-PARTY INSURANCE CLAIM PAYOUTS," filed Aug. 26, 2016, and incorporated herein by reference in its entirety.

TECHNICAL FIELD

Embodiments of the present disclosure relate to processing multi-party insurance claim payouts.

BACKGROUND

Today, insurance claim processing is a detailed, complex, and time-consuming process. In particular, a typical scenario in regard to a homeowner is as follows. An incident occurs that leads to an insurance claim (e.g., a natural disaster, such as a tornado, flooding, etc.). The homeowner contacts their insurance company to obtain financial relief to cope with the damage. The insurance company dispatches an agent to the home to assess the damage caused by the incident. As a result of the analysis and assuming the insurance company chooses to payout the claim, the insurance company issues a two-party check to both the home owner and the mortgage company of the homeowner. The homeowner must then track down a representative of the mortgage company to endorse the check. Upon endorsement, the homeowner may finally receive the insurance claim payout. Thus, not only must a series of steps occur in order for the homeowner to obtain the insurance claim payout, but the process is very time-consuming. In particular, obtaining an endorsement from a representative of the mortgage company may be extremely time-consuming. Further, even after an endorsement from the representative, the homeowner must then wait until the funds are actually dispersed. Depending on the nature of the damage and the homeowner's financial situation, each passing day can be very challenging for the homeowner to cope with their situation. Thus, several pain points exist with the current two-party processing scenario.

SUMMARY

A first example embodiment relates to an apparatus. The apparatus includes a claim payment circuit structured to receive an insurance claim payment request regarding a physical multiple party check based on an insurance claim regarding an insured entity; a disposition circuit structured to evaluate the insurance claim payment request, and provide a final disposition message responsive to the evaluation, the final disposition message including an indication regarding an authorization to disburse a portion of funds of a claim amount designated in the insurance claim payment request, wherein the provided disposition message activates a graphical user interface to display the final disposition message; and a fund transfer circuit structured to facilitate dispersal of the portion of funds to the insured responsive to the final disposition message.

Another example embodiment relates to a system. The system includes a multiple party insurance claim processing circuit comprising memory having instructions stored therein and at least one processor structured to execute the instructions to: receive an insurance claim payment request based on an insurance claim regarding an insured entity; evaluate the insurance claim payment request; and cause dispersal of an amount of funds based on the insurance claim payment request to the insured entity.

Another example embodiment relates to a method. The method includes receiving, by a processing circuit, an electronic insurance claim payment request based on an insurance claim regarding an insured entity; evaluating, by the processing circuit, the electronic insurance claim payment request; and facilitating, by the processing circuit, a dispersal of an amount of funds based on the electronic insurance claim payment request to the insured entity.

These and other features, together with the organization and manner of operation thereof, will become apparent from the following detailed description when taken in conjunction with the accompanying drawings.

DETAILED DESCRIPTION

Figure 1:
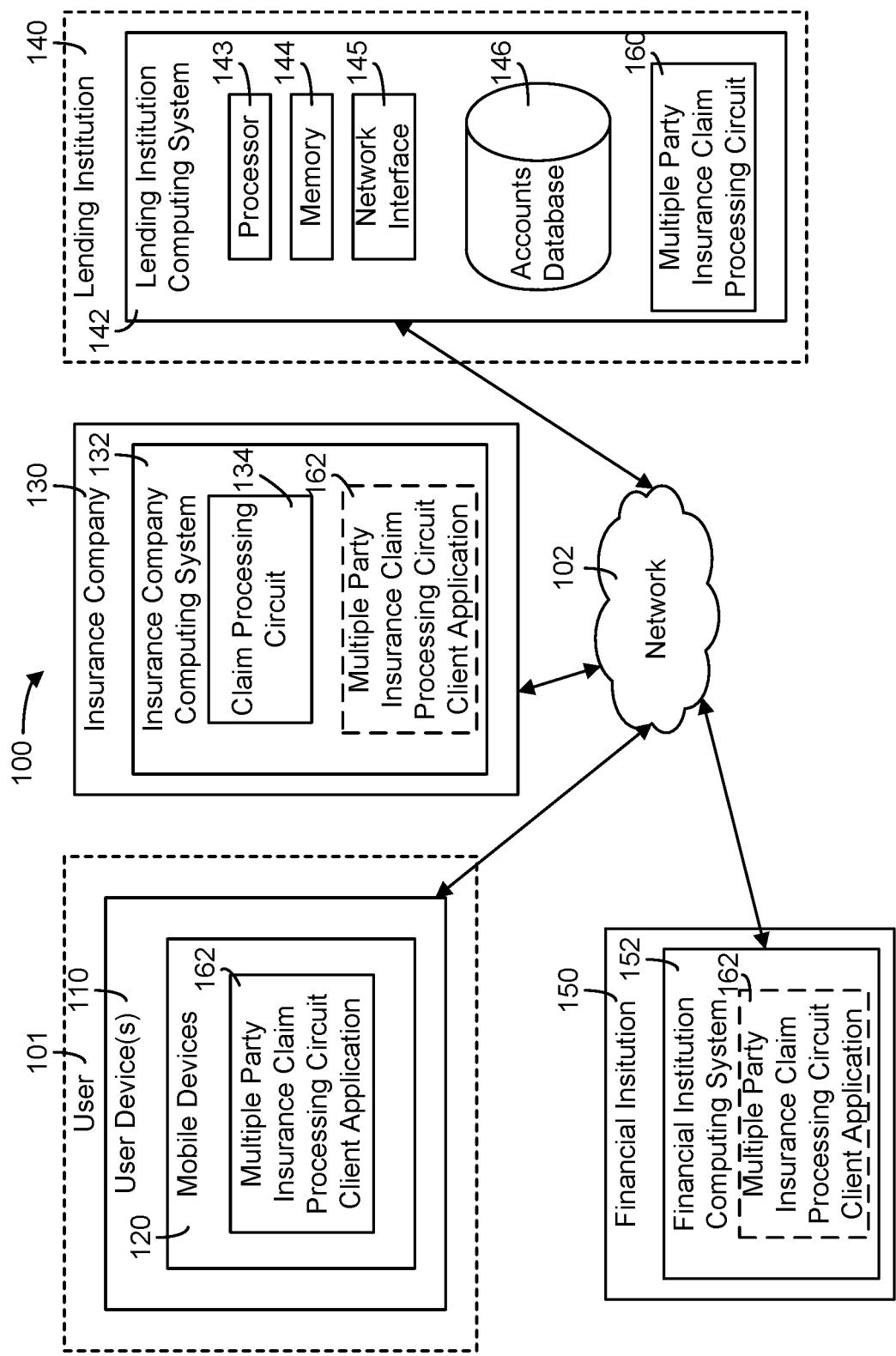
FIG. 1 is a diagram of a computing system, according to an example embodiment.

Referring to the Figures generally, systems, methods, and apparatuses for processing multiple party insurance claim payouts are provided according to various embodiments herein. According to the present disclosure, a multiple party insurance claim processing circuit may be communicably coupled to a user device associated with a user and an insurance company computing system. In this regard, the user may be an insured person or entity. Based on the communicable coupling, the multiple party insurance claim processing circuit may be structured to receive an insurance claim payment request (e.g., from the insurance company computing system). For example, the user's home may have been recently affected by a natural disaster, which in turn caused the user to make an insurance claim. In response, the insurance company evaluated the claim and decided to pay the claim or a portion thereof. Accordingly, the insurance company issued the insurance claim payment request. Thus, the insurance claim payment request refers to an authorization from the insurance company associated with the insurance company computing system to pay the insurance claim. The insurance claim payment request may include an identification of the recipient of the payment, an amount of payment, etc. Accordingly, the insurance claim payment may include a physical check such as a multi-party check, an electronic check or other electronic deposit form, and/or a combination thereof. In this regard and in one embodiment, the insurance claim payment request is a multi-party check, which designates the user (i.e., the insured) and the user's lending institution as the recipient. Responsive to receiving the insurance claim payment request, the multiple party insurance claim processing circuit may generate and provide an authorization request to the insured. Beneficially and as an additional layer of security, the authorization request may serve as an identification process to confirm the identity of the insured. In some arrangements, the authorization request may be tailored to the specific claim (e.g., a home damage claim versus an automobile damage claim, claims below or within a certain amount, etc.). For example, for relatively larger claims (e.g., greater than $15,000), the authorization request may be a request for a biometric of the insured. After verification, the multiple party insurance claim processing circuit may evaluate the insurance claim payment. Evaluation may include confirming the identity of the insured (e.g., via the authorization request described above), confirming a sufficiency of information, determining an indication of fraud regarding the insured, whether the requested amount appears to be commiserate with the damage, and any other check to evaluate the insurance claim payment. Based on the evaluation, the multiple party insurance claim processing circuit may disburse or facilitate dispersal of the insurance claim payment amount.

In one embodiment, the multiple party insurance claim processing circuit causes or facilitates causing a dispersal of an entire amount of the insurance claim payment request (i.e., the full claim amount authorized by the insurance company). In another embodiment, the multiple party insurance claim processing circuit causes or facilitates causing dispersal of a partial amount of the insurance claim payment amount. Such partial disbursement may be based on the evaluation. For example, for relatively larger claims (e.g., fund requests above a threshold amount, such as $15,0000), the multiple party insurance claim processing circuit may provide a safeguard against misappropriation of the insurance claim payment amount by requiring a work progression indicator (e.g., a status update). The work progression indicator may be received directly from the insured and/or from relevant personnel (e.g., a contractor performing the house repairs). Thus, the remainder of the insurance claim payment amount may be held in an escrow account and then disbursed as the work progression indicators show more and more progress being performed. Beneficially, such a mechanism alleviates providing a relatively large disbursement amounts. Further, such a mechanism enables monitoring of the claim to reduce the likelihood of insurance fraud.

The systems, methods, and apparatuses of the present disclosure provide several advantages. Beneficially, a disposition regarding the insurance claim payment may be accomplished in real-time or near real-time, which greatly reduces the time-delay that many claimants experience in regard to typical multi-party payouts. Further, by manipulating an input device of a user device to, e.g., provide biometric information or to encrypt the payment request, the multiple party insurance claim processing circuit may securely or relatively securely process the multi-party insurance claim payout. These and other features and benefits are described more fully herein.

As used herein, the term "multi-party insurance claim(s)" refers to an insurance payout directed towards two or more parties. In particular, the two or more parties include the insured party(ies) and a lender. Thus, an example of a multi-party insurance claim is a two-party check. The two-party check may be made out to the insured party(ies) and the lender. In this regard, authorization may be required from each of the parties before the funds associated with insurance claim payment are released or disbursed. Thus and as used herein, the "multi-" or "multiple" part designation refers to the ability to designate more than two entities. It should be understood that while the bulk of the disclosure is directed towards a multi-party insurance claim for an insured home, the disclosure is also applicable with multi-party payouts for other insured objects (e.g., automobiles, boats, animals, etc.). Thus, the present disclosure is not meant to be limiting to only the home-context. Rather, the present disclosure may be applicable with any multi-party payout situation where the payout is endorsed by two or more parties and where one of those parties is a lender. Accordingly, those of ordinary skill in the art will readily recognize and appreciate the wide applicability of the present disclosure.

Referring now to FIG. 1, a block diagram of a computing system 100 is shown according to an example embodiment. As described herein, the computing system 100 may enable relatively fast and efficient processing of multi-party insurance claims. As shown, the computing system 100 includes one or more user devices 110 associated with a user 101, an insurance company 130 associated with an insurance company computing system 132, a lending institution 140 having or including an associated lending institution computing system 142, and a financial institution having or including an associated financial institution computing system 152. The components of FIG. 1 may be communicably and operatively coupled to each other over a network 102. The network 102 may be any type of type of network. For example, the network 102 may be a wireless network interface (e.g., 802.11X, ZigBee, Bluetooth, Internet, etc.), a wired network interface (e.g., Ethernet), and/or any combination thereof. The network 102 is structured to permit the exchange of data, values, instructions, messages, and the like between and among the user device 110, the insurance company computing system 132, the lending institution computing system 142, and the financial institution computing system 152.

The insurance company 130 may be any type of insurance entity that provides insurance services. For example, the insurance company 130 may provide residential or commercial property loans, automobile loans, boat loans, personal loans, etc. Further, in this arrangement, the insurance company 130 is a separate entity relative to the lending institution 140 and the financial institution 150.

The insurance company 130 is shown to include or be associated with an insurance company computing system 132 having a claim processing circuit 134. The computing system 132 may include any combination of processing and network interface components including, but not limited to, one or more memory components, one or more processing components, a network interface that facilitates communicable coupling over the network 102 to the user device 110 and lending institution 140, and the like. The one or more memory components, processing components, and network interface may have the same or similar structure as that described herein below with respect to the processor 143, memory 144, and network interface 145 of the lending computing system 142. Further, the insurance company computing system 132 may also include an accounts database that is structured to hold, retain, or otherwise serve as a searchable repository for holding information relating to each provided loan and loan recipient.

The claim processing circuit 134 is structured to facilitate the processing of insurance claims submitted by insured entities or agents of the insurance company 130. The claim processing circuit 134 may be structured to receive and process a claim. In this regard, the term "claim" as used herein with respect to the claim processing circuit 134 refers to a request from an insured for the insurance company 130 for a payment in accordance with the insured's insurance policy. The claim may be received directly from the insured or may be received from a representative of the insurance company 130 (e.g., an insurance agent). For example, an insurance agent may be disposed in a natural disaster area and submit claims on behalf of one or more affected insureds within the natural disaster area.

Thus, to enable processing of a claim directly from a customer, the claim processing circuit 134 may be or be provided as a server-based application, hard coded or at least partially hard coded into memory of the user device 110, a web-based interface, etc. that provides a graphical user interface (GUI) on the user device 110. Via the GUI, the insured or insurance company agent may provide various information to submit a claim. For example, the insured may take one or more photos of the damage, provide identifying information (e.g., name, passcode, account number, etc.), and any other information related to a claim in order to submit that claim or claims to the claim processing circuit 134 and, in turn, the insurance company 130.

In one embodiment, the claim processing circuit 134 may make a decision whether to approve the claim based on logic contained within the claim processing circuit 134. In another embodiment, an insurance agent or other relevant personnel associated with the insurance company 130 may make a determination whether to approve claim. In this embodiment, the claim processing circuit 134 may serve as a conduit of receiving and providing the claim to the appropriate personnel. In either configuration, a notification may be generated and provided to, e.g., the user device 110 responsive to determining whether to approve the claim (and, eventually, the multiple party insurance claim processing circuit 160). If more information is required to make a decision, the notification may be a request for more information as compared to an approval or denial message. It should be understood that the remaining disclosure is based on an approval or partial approval of the claim (e.g., partial approval is meant to indicate that an amount less than the full requested amount is approved for dispersal to the insured).

As shown, the lending institution 140 includes or is associated with an lending institution computing system 142. In the example shown, the lending institution 140 represents a lending entity (e.g., a home mortgage provider). As a lending entity, the lending institution 140 may provide loans to various entities, such as individuals, groups of individuals, entities, and the like. Accordingly, the lending institution 140 is structured to provide and therefore hold one or more loans (e.g., a home mortgage, an automobile purchase loan, etc.) for a user.

The lending institution computing system 142 includes a processor 143 and a memory device 144, a network interface 145, an accounts database 146, and the multiple party insurance claim processing circuit 160. The processor 143 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 144 (e.g., RAM, ROM, NVRAM, Flash Memory, hard disk storage, etc.) may store data and/or computer code for facilitating at least some of the various processes described herein. In this regard, the memory 144 may store programming logic that, when executed by the processor 143, control the operation of the enterprise institution computing system 142. The network interface 145 facilitates the sending and receiving of data over the network 102 (e.g., to and from the user device 110, etc.).

The accounts database 146 may be structured to store customer information and account information relating to accounts held by the lending institution 140. More particularly, the accounts database 146 may store, categorize, classify, and otherwise serve as a searchable repository for loan accounts. The loan accounts may include information relating to a loan provided by the lending institution 140, which includes, but is not limited to, a loan account number, an address number of the loan recipient, contact information regarding the loan recipient, a social security number regarding the loan recipient, employment history regarding the loan recipient, information regarding the loan itself (e.g., a term, an interest rate, etc.), a representative who authorized the loan, a reason/object for the loan (e.g., home mortgage, automobile loan, boat loan, personal loan, small business loan, etc.), and any other information regarding the loan provided by the enterprise institution 140. Due to the high amount of information that may be stored in the accounts database 146 and as mentioned above, the accounts database 146 may include logic that facilitates the searching, analysis, classification, and any other capabilities for providing efficient storage solutions. For example, the accounts database 146 may be configured as a table with logic that enables authorized personnel to search. Thus, those of ordinary skill in the art will readily appreciate and recognize the wide configurability of the accounts database 146 with all such variations intended to fall within the scope of the present disclosure.

The financial institution 150 may be an entity that provides financial services and products, such as banking and wealth management. For example, in regard to wealth management, the financial institution 150 may facilitate helping, assisting, or otherwise managing a customer's wealth (e.g., investing services, retirement services, etc.). In regard to banking, the financial institution 150 may be a banking entity that holds one or more bank accounts (e.g., demand deposit accounts such as a checking account, etc.). In this arrangement, the financial institution 150 is a separate entity relative to the lending institution 140 and the insurance company 130.

The financial institution 150 is shown to include or be associated with a financial institution computing system 152. The computing system 152 may include any combination of processing and network interface components including, but not limited to, one or more memory components, one or more processing components, a network interface that facilitates communicable coupling over the network 102 to the user device 110 and lending institution 140, and the like. The one or more memory components, processing components, and network interface may have the same or similar structure as that described herein with respect to the processor 143, memory 144, and network interface 145 of the lending computing system 142. Further, the financial institution computing system 152 may also include an accounts database that is structured to hold, retain, or otherwise serve as a searchable repository for information relating to each account held at the financial institution 150 (e.g., information regarding each demand deposit account).

As shown and mentioned herein, the financial institution 150 is separate from each of the insurance company 130 and the lending institution 140. However, this depiction is exemplary only. For example, in other configuration, the financial institution may include the lending institution. As such and in this configuration, the financial institution may providing banking and lending services to customers and potential customers. In another example, the insurance company 130 may be a party of the financial institution 150 or the lending institution 140. Thus, the depiction of the components in FIG. 1 is exemplary only and those of ordinary skill in the art will appreciate the high configurability of the components, with all such variations intended to fall within the scope of the present disclosure.

As shown, the user 101 may have or be associated with a user device 110. The user 101 may include individuals, business representatives, large and small business owners, and any other entity. In one embodiment, the user 101 is insured by the insurance company 130, has a loan for the insured object through the lending institution 140, and banks at the financial institution 150. In this regard and unless otherwise stated, the user 101 may be referred to as the insured herein. It should be understood that while the bulk of the disclosure contained herein is in regard to this embodiment, this configuration is not meant to be limiting. In this regard and in another embodiment, the user 101 may be a representative or agent of the insurance company 130. In yet another embodiment, the user may be a representative or agent of the financial institution 150. In still another embodiment, the user may be a representative or agent of the lending institution 140. Thus and as described herein, the multiple party insurance claim processing circuit client application 162 may be controlled by at least one of the insured or agent of the at least one of the financial institution, insurance company, and lending institution. Accordingly, at least one of these parties may explicitly provide information through the application 162 to the multiple party insurance claim processing circuit 160. Before turning to these specifics, the user device 110 is firstly described.

The user device 110 may be generally described as a mobile device 120. The mobile device 120 may include any wearable device. Wearable devices refer to any type of device that a user wears including, but not limited to, a watch (e.g., a smart watch), glasses (e.g., eye glasses, sun glasses, smart glasses, etc.), bracelet (e.g., a smart bracelet), etc. Mobile device 120 may also include any type of mobile device of a user 101 including, but not limited to, a phone (e.g., a smartphone, etc.) and a computing device (e.g., a tablet computer, a laptop computer, a person digital assistant, desktop computer, etc.). Accordingly, the user device 110 may include a display device (e.g., a screen) and one or more input/output devices (e.g., a touch screen, microphone, speaker, keyboard, etc.).

As described herein, the multiple party insurance claim processing circuit 160 may be structured to receive an insurance claim payment request, evaluate the insurance claim payment request, and disperse or facilitate dispersal of the funds associated with insurance claim payment request to the user 101 (i.e., insured). In one embodiment, the multiple party insurance claim processing circuit 160 causes to provide a partial disbursement, where disbursement of the remaining funds is in response to reception of one or more work progression indicators regarding the claim. Further and in one embodiment, the multiple party insurance claim processing circuit 160 may generate and provide an authorization request to the insured in order to receive explicit authorization from the insured to process the insurance claim payment request. Beneficially, such a step alleviates or substantially alleviates the possibility of un-authorized entities intercepting the insurance claim payment requests. As described herein and advantageously, the insurance claim payment may be received as an electronic insurance claim payment request (e.g., an electronic deposit request) or as a physical check (e.g., a physical multi-party check), such that the multiple party insurance claim processing circuit 160 may be useable/applicable in each circumstance.

As shown, the multiple party insurance claim processing circuit 160 is included with the lending institution 140. In this regard and as mentioned herein above, a multi- or multiple party insurance payment check designates the insured (i.e., user 101) and the lending institution as the recipients. As described herein, the multiple party insurance claim processing circuit 160 may evaluate the claim prior to the allowing a release of the funds to the insured. In order to allow the release of funds, the multiple party insurance claim processing circuit 160 is allowed (by the designated recipient on check) to make such authorizations. Accordingly and in one embodiment, the multiple party insurance claim processing circuit 160 is disposed with the lending institution 140, where the circuit 160 is provided with a final authority to allow dispersal of the funds of the insurance payment claim. It should be understood that in certain configurations, the lending institution 140 may hire or commission a third-party service to process insurance claim payments. In this regard, the multiple party insurance claim processing circuit 160 may be included with a computing system associated with the third-party service provider.

However, the configuration described above where the multiple party insurance claim processing circuit 160 is included with the lending institution 140 is not meant to be limiting as the multiple party insurance claim processing circuit 160 may be included with other components of FIG. 1 as well (e.g., the user device 110, the financial institution 150, and/or the insurance company 130). In these configurations, the multiple party insurance claim processing circuit 160 may be communicably coupled to the lending institution 140 (i.e., the other designated recipient on a multi-party check) in order to quickly or relatively quick obtain approval to release funds associated with an insurance claim payment amount. Further and according to an alternate embodiment, the multiple party insurance claim processing circuit 160 may be a separate computing system relative to each of the insurance company 130, lending institution 140, and financial institution 150. Accordingly, a high configurability/arrangement of the multiple party insurance claim processing circuit 160 is possible, with all such variations intended to fall within the scope of the present disclosure.

The multiple party insurance claim processing circuit 160 may support or provide a multiple party insurance claim processing circuit client application 162. At the support or instruction of the circuit 160, the client application 162 may generate or provide one or more graphical user interfaces (GUIs) that enable the operator/user of the GUI to input information and/or otherwise exchange information with the multiple party insurance claim processing circuit 160. In this regard and as shown, the multiple party insurance claim processing circuit client application 162 may optionally be included with the insurance company computing system 132 and/or the financial institution computing system 152. Accordingly, in one embodiment, the multiple party insurance claim processing circuit 160 may provide an application programming interface (API) and/or a software development kit (SDK) with the client application 162 that facilitates the integration of other applications with the multiple party insurance claim processing circuit client application 162. Thus, the multiple party insurance claim processing circuit client application 162 may be an API that is integrated with one or more applications provided by the insurance company 130, lending institution 140, and/or financial institution 150.

It should be understood that other configurations regarding the multiple party insurance claim processing circuit are possible. For example, the multiple party insurance circuit client application 162 may be a server-based application executable on the user device 110. In this regard, a user may have to first download the application(s) prior to their usage. The multiple party insurance claim processing circuit 160 may then at least partly control operation of the client application 162. In another example, the multiple party insurance circuit client application 162 may be hard coded into the memory of the user device 110. Thus, in this configuration and as mentioned above, the multiple party insurance claim processing circuit 160 may also be included with the user device 110. For example, the multiple party insurance claim processing circuit 160 may be provided as an integrated circuit, a system on a chip, machine-readable media executable by a processor of the user device 110, and/or some combination therewith. Accordingly, a wide degree of structural configuration is possible with all such possibilities intended to fall within the scope of the present disclosure.

Figure 2:
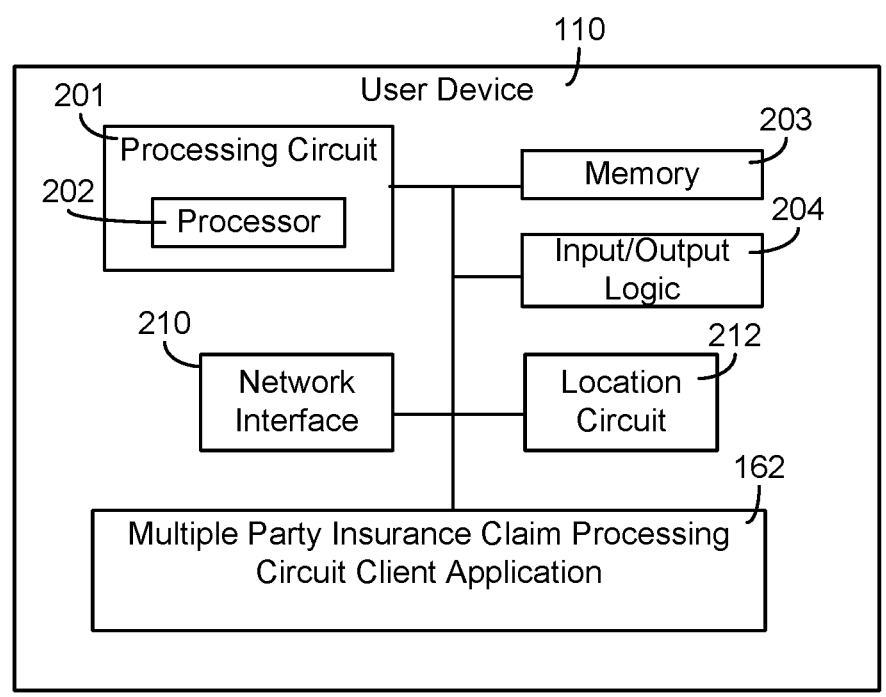
FIG. 2 is a diagram of the user device of FIG. 1, according to an example embodiment.
Figure 3:
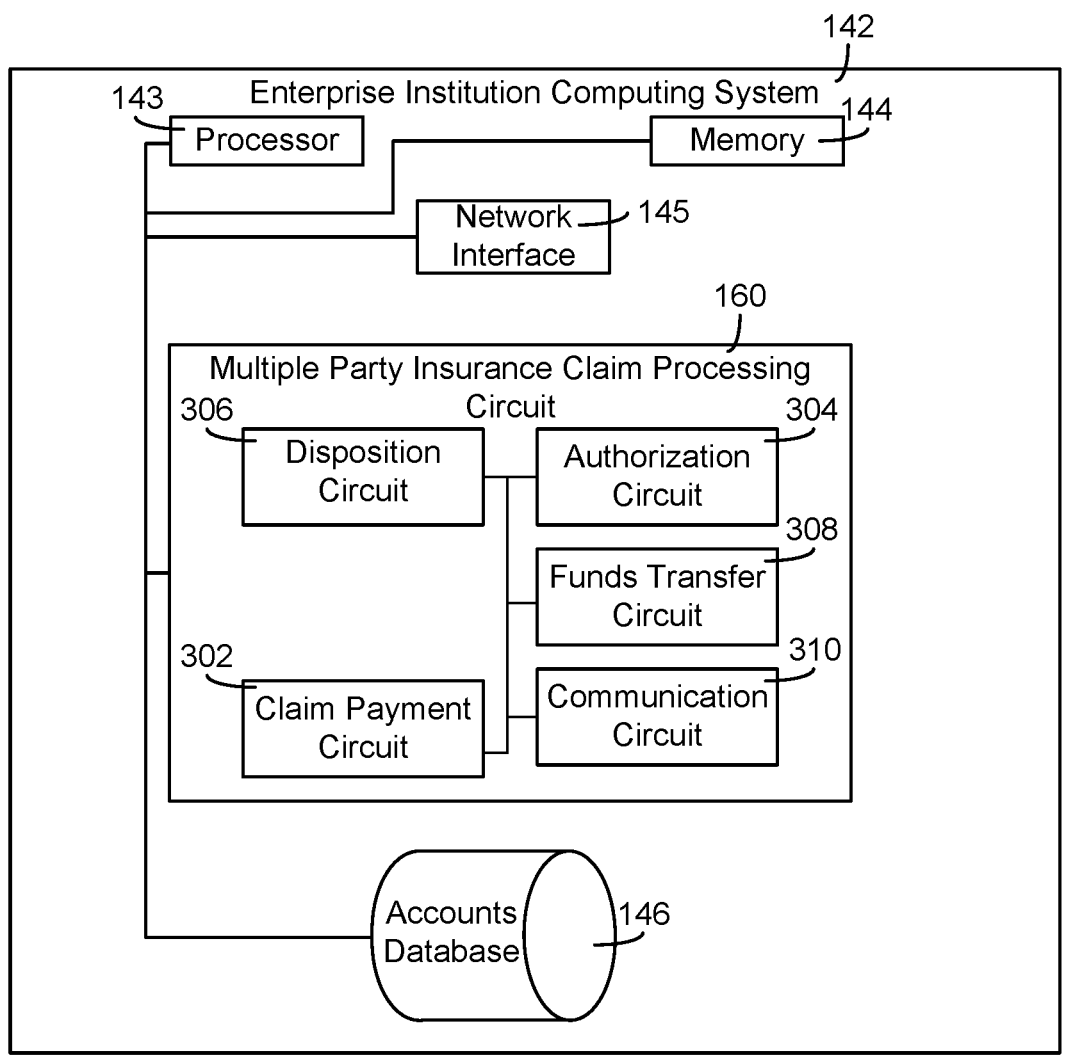
FIG. 3 is a diagram the multiple party insurance claims processing circuit of FIG. 1, according to an example embodiment.

Based on the foregoing, the structure and function of the multiple party insurance claim circuit 160 may be explained more fully in regard to FIG. 3. However, before turning to the structure and function of the multiple party insurance claim processing circuit 160, the user device 110 may firstly be described. Accordingly, referring now to FIG. 2, the function and structure of the user device 110 with the multiple party insurance claim processing circuit client application 162 is shown in greater detail, according to an example embodiment. As shown in FIG. 2, the user device 110 includes a processing circuit 201 having a processor 202 and a memory 203. The processor 202 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 203 (e.g., RAM, NVRAM, ROM, Flash Memory, hard disk storage, etc.) may store data and/or computer code for facilitating the various processes described herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The user device 110 is shown to include various circuits and logic. More particularly, the user device 110 includes input/output logic 204, a network interface 210, a location circuit 212, and the multiple party insurance claim processing circuit client application 162.

The network interface 210 is adapted for and structured to establish a communication session via the network 102 with at least one of the insurance company computing system 132, the lending institution computing system 142, and the financial institution computing system 152. Accordingly, the network interface 210 includes any of a cellular transceiver (e.g., CDMA, GSM, LTE, etc.), a wireless network transceiver (e.g., 802.11X, ZigBee, Bluetooth, etc.), a wired transceiver, and/or a combination thereof (e.g., both a cellular transceiver and a Bluetooth transceiver). Further, the network interface 210 may include cryptography capabilities to establish a secure or relatively secure communication session with the at least one of the components of FIG. 1. In this regard, data may be encrypted to prevent or substantially prevent the threat of hacking.

The input/output logic 204 may be structured to receive and provide communication(s) to a user of the device 110. In this regard, the input/output logic 204 may be structured to exchange data, communications, instructions, etc. with an input/output component of the device 110. Accordingly, in one embodiment, the input/output logic 204 may include an input/output device such as a display device, a touchscreen, a keyboard, a speaker, a camera, and a microphone. In another embodiment, the input/output logic 204 may include communication circuitry for facilitating the exchange of data, values, messages, and the like between an input/output device and the components of the user device 110 (e.g., the multiple party insurance claim processing circuit client application 162). In yet another embodiment, the input/output logic 204 may include machine-readable media for facilitating the exchange of information between the input/output device and the components of the user device 110. In still another embodiment, the input/output logic 204 may include any combination of hardware components (e.g., a touchscreen), communication circuitry, and machine-readable media.

The location circuit 212 may be structured to receive location data and determine a location of the user device 110 based on the location data. In one embodiment, the location circuit 212 may include a global positioning system (GPS) or any other type of location positioning system. As such, the location circuit 212 may receive latitude data, longitude data, and any other type of location or position data to determine the location of the user device 110. In other embodiments, the location circuit 212 may receive an explicit location identification from the user of the device 110. All such variations are intended to fall within the spirit and scope of the present disclosure.

As mentioned above, the multiple party insurance claim processing circuit client application 162 may be communicably coupled to the components of the user device 110 and to the multiple party insurance claim processing circuit 160. Thus, the multiple party insurance claim processing circuit 160 may control various activities, capabilities, and functions of the user device 110 via the multiple party insurance claim processing circuit client application 162. Further and as described herein, the multiple party insurance claim processing circuit client application 162 may provide one or more GUIs that enable the exchange of information with a user of the user device 110 and the multiple party insurance claim processing circuit 160.

With the above in mind, an example structure for the multiple party insurance claim processing circuit 160 is shown in FIG. 3. The multiple party insurance claim processing circuit 160 is shown to include a claim payment circuit 302, an authorization circuit 304, a disposition circuit 306, a funds transfer circuit 308, and a communication circuit 310. The circuits 302-310 are structured to enable relatively fast processing of multi-party insurance payment checks, along with various other capabilities described herein. While various circuits, interfaces, and logic with particular functionality are shown in FIG. 3, it should be understood that the multiple party insurance claim processing circuit 160 may include any number of circuits, interfaces, and logic for completing the functions described herein. For example, the activities of multiple circuits may be combined as a single circuit, as additional circuits with additional functionality may be included, etc.

The claim payment circuit 302 is structured to receive an insurance claim payment (also referred to herein as an insurance claim payment request or an insurance claim payment message). The "insurance claim payment request" refers to an insurance claim that the insurance company 130 has agreed to pay and any accompanying claim-related information. In this regard, the insurance claim payment request may be thought of as a request to authorize/enable payment of the insurance claim to the insured (because, as described above, the circuit 160 may have authority from the lending institution—i.e., the other designated party on a multi-party check—to endorse or authorize endorsement of the multi-party check). Accordingly, the "insurance claim payment" may include a message indicating an approved claim request, an approved claim amount, information relating to the check (if one is issued), and an identification of the parties to receive the approved claim amount. More particularly, the insurance claim payment request may refer collectively to information regarding an issued check to the insured (e.g., a multi-party check, which is described below) and any additional claim-related information. Additional claim-related information may include, but is not limited to, an insurance policy number, an insurance claim number, an insured's property address, a date the loss occurred, multiple addresses if multiple addresses were affected, a cause of loss description, a payment request reason (e.g., loss payment, recoverable depreciation, emergency funds, supplemental payment, etc.), an adjuster's worksheet, a name of user (i.e., the insured or borrower), an email address of the user, a phone number of the user and a phone number type (e.g., work, cell, etc.), an identification of the mortgagor of the property, a position of the mortgage (e.g., 1 for first mortgage, 2 for second mortgage, etc.), a mortgage loan number, etc.

The insurance claim payment request may be received in an electronic format or via a physical check (e.g., money order, cashier's check, etc.), which may also be received in an electronic format; however, the difference between these two scenarios is that the electronic insurance payment request (i.e., electronic format) is done without creating a physical check. Accordingly, reception of the electronic insurance payment request may be described as follows. In this configuration, an insured or insurance company agent may submit a claim via the claim processing circuit 134 (in this regard, the circuit 134 may provide a GUI that enables claim reception). Submission of the claim may include accompanying photos, identification information of the insured, time of the incident, location of the incident, whether any other parties were involved and an identification of those parties, a narrative regarding the incident, etc. The claim processing circuit 134 may evaluate the claim directly or provide the received claim to a representative (e.g., an insurance company agent). Upon a review of the claim, a decision may be made whether to payout the claim. Rather than providing the insured with a check directly, the claim processing circuit 134 may provide an electronic message over the network 102 (i.e., an electronic insurance claim payment message). In one embodiment, the electronic message is an electronic deposit that indicates the insured as the receiving party along with at least some of the aforementioned claim-related information (e.g., the claim amount, date of incident, etc.).

In another embodiment and as mentioned above, the insurance claim payment is received via a physical check (which may also be received electronically, but here, as mentioned above, this scenario is characterized by the actual issuance of a check by the insurance company). According to the present disclosure, the physical check may be a multi-party check. The "multi-party check" may indicate the insured and at least one other party as the recipient of the check; hence, a "multi-party" check. More particularly, the multi-party check may be a physical check made out to the insured party and the lending party, which as described above may be the lending institution 140.

In one example implementation, the user device 110 may include a camera device or another scanning tool capable of obtaining an image of the multi-party check. In particular and according to one embodiment, the claim payment circuit 302, via the multiple party insurance claim processing circuit client application 162, may take a picture or image of the multi-party check and tag or otherwise assign a unique identifier to the picture or pictures. The tag may be a numeric, alpha-numeric, or another type of identifier of the picture or pictures. Further, the tag may be generated by the claim payment circuit 302. If the picture is altered in any way from the original image, the tag may be changed (e.g., removed, altered, etc.). At which point, the disposition circuit 306 (described below) may unfavorably evaluate the insurance claim payment. In another configuration, the claim payment circuit 302 may only receive an image from the user device when the camera or scan tool is accessed via the multiple party insurance claim processing circuit client application 162. As an example, a user may select an icon associated with the multiple party insurance claim processing circuit client application 162, select an obtain image icon, which then launches the camera application from within the multiple party insurance claim processing circuit client application 162. Such a configuration avoids using the camera directly; rather, the camera is operated under the control of the claim payment circuit 302 via the client application 162. In either configuration—tagging or using the camera under the control of the multiple party insurance claim processing circuit client application 162—the claim payment circuit 302 is implementing an additional security layer or protocol to reduce or substantially reduce the likelihood of fraudulent activity to alter the multi-party check (to, e.g., change the amount).

As alluded to above and in another example implementation, an image of the multi-party check may be sent from the insurance company 130 to the claim payment circuit 302 directly. As mentioned above, the user 101 may be a representative of the insurance company 130. Thus, in this configuration, the insurance claim payment may be received directly from the insurance company as opposed to the insured as described in the previous paragraph. However and like described above, the same or similar types of security protocols may be implemented to reduce a likelihood of fraudulent activity.

In either instance and according to one configuration, the multi-party check may include embedded information. In this regard, the multi-party check may still convey the additional claim-related information, as described above. For example, in one configuration, the multi-party check may include a bar code. The bar code may be scanned or otherwise read via a camera and barcode reader logic included with the user device 110, whereby the barcode contains the or at least some of the aforementioned claim-related information.

Beneficially and in either of the aforementioned arrangements where the insurance payment claim is received from insurance company 130 or the user 101 (based on issuance of a physical check), these arrangements allow for initializing the claim payment process remotely (i.e., where the user 101 or insured is away from a physical location of the lender to obtain an endorsement from a representative of the lender or from having to mail the multi-party check to a specified location for a representative of the lender (i.e., lending institution 140) to endorse the multi-party check). It should be understood that in each situation, the insured or insurance company may have an option to physically input additional claim related information rather than or in addition to using an automatic mechanism (e.g., embedded information in a physical check). For example, the claim payment circuit 302 may provide a GUI via the multiple party insurance claim processing circuit client application 162 on the user device 110 that includes several fields for the submitting party (e.g., the insurance company or the insured) to provide the additional claim-related information (see FIG. 4 for an example GUI).

In some situations, the user 101 or insured may visit a location associated with the lending institution 140 (e.g., a branch location). In this regard, the user 101 may present the multi-party check to a representative at the location associated with the lending institution 140. The representative may enter information contained on the multi-party check (i.e., recipient parties, routing number, etc.) and any claim related information into a GUI generated and provided by the multiple party insurance claims processing circuit client application 162. In this instance and as mentioned above, the user device 110 may be a mobile device operated by the representative of the lending institution.

Thus, the claim payment circuit 302 may receive the insurance claim payment message in at least two ways: i) electronically (e.g., via an electronic deposit); or, ii) electronically, but based on the issuance of a physical check (e.g., via scanning and sending). In each instance, the claim payment circuit 302 receives an indication that the insurance company 130 has agreed to pay a claim, the amount agreed to pay and the recipients of the amount, and any other accompanying claim-related information that is described above.

Upon receiving the insurance claim payment message, the authorization circuit 304 is structured to identify the insured and generate and provide an authorization request to the insured based on the identification. This authorization may be beneficial due to providing an additional layer of security before releasing/disbursing the insurance claim payment amount to the insured. Of course, in other configurations, this authorization may be excluded/de-activated.

Identification of the insured by the authorization circuit 304 may be described as follows. Upon receipt of the insurance payment claim message and any accompanying claim-related information, the authorization circuit 304 may query the accounts database 146 for a match. If a match is found or identified, the authorization circuit 304 may then look-up or otherwise obtain the user's contact information stored within the database 146 (rather than solely relying on the contact information that may be included in the insurance payment claim message). If a match is not identified, the authorization circuit 304 may generate and transmit a notification via the multiple party insurance claim processing circuit client application 162 to inform the submitting party that no records have been found and to re-check the provided information.

If a match is identified, the generated and provided authorization request may take a variety of forms. In this regard, the authorization request may include, but is not limited to, an email, a text message, a phone call, a push notification, etc. In one embodiment, the authorization circuit 302 only uses the contact information associated with the insured stored in the accounts database 146. In another embodiment, the authorization request uses contact information contained in the insurance claim payment message.

In addition to the form, the provided authorization request may also include an indication of how to respond. For example, the authorization request may notify the user to please submit biometric information (e.g., a fingerprint). As another example, the authorization request may notify the user to please submit a provided passcode that is included with the authorization request (e.g., a password, a numeric value, an alphanumeric value, etc.). Submission of the response to the authorization request may be via the GUI of the multiple party insurance claim processing circuit client application 162. Beneficially, this ensures or substantially ensures that the response may be securely provided to the authorization circuit 304.

Based on the foregoing, an example may be described as follows. The authorization circuit 304 identifies the insured and provides a text message with a passcode to the insured using the contact information (e.g., phone number) stored in the accounts database 146. The insured receives the text message, selects an icon to launch the GUI provided by the multiple party insurance claim client application 162, and selects a field to insert the passcode. The user may then submit this information, which is transmitted back to the authorization circuit 304 to confirm.

In certain instances, at least one of the required response and provided authorization request may be based on a characteristic of the insurance claim payment message. In one embodiment, the characteristic is payment amount. As an example, relatively high payment amounts (e.g., greater than a threshold amount, such as $25,000) may require a relatively more secure response information (e.g., biometric information) than relatively low payment amounts (e.g., at or below $25,000). As an example use case, if the amount is above a threshold of $25,000, the authorization request may be provided via a telephone call (e.g., a robo-call that says to the party to provide biometric information). Thus, in one instance, for relatively high insurance claim payment amounts (e.g., above a threshold, such as $25,000), biometric information may be required as the authorization response. As another example, if the amount is below a low amount threshold (e.g., below $500), the authorization circuit 304 may not be activated. In this regard, the multiple party insurance claim processing circuit 160 may simply assume the identity of the insured to be authorized. Of course, the high and low amount thresholds are highly configurable and may change from application-to-application. In another embodiment, the characteristic may be the type of property that is the subject of the insurance payment claim request. For example, for relatively higher valued property (e.g., a commercial building versus a motorcycle), relatively more stringent authorization responses may be required (e.g., biometric information versus a passcode). It should be understood that the aforementioned characteristics used to define the authorization request and response are not meant to be exhaustive as the present disclosure contemplates a wide variety of factors upon which the authorization circuit 304 may use to generate an authorization request and determine the desired response.

In certain examples, a time duration may be implemented with the authorization request that defines how long the insured has to respond before or until the authorization circuit 304 considers the insurance payment claim message void or expired. For example, the authorization circuit 304 may allot 30 minutes before considering the insurance payment claim message expired. This is advantageous in order to ensure insurance payment claim messages do not exist indefinitely. Further, such a feature may reduce memory requirements to improve performance of the multiple party claim processing circuit 160 overall.

Assuming the identity of the insured has been verified (assuming this identification process portion is implemented), the disposition circuit 306 is structured to receive and evaluate the insurance claim payment message. In response to the evaluation, the disposition circuit 306 may be structured to provide a final disposition message, which indicates when and how much of the claim amount is authorized for disbursement to the insured. The evaluation may be used to determine whether the full or a partial amount of the claim payment is provided to or facilitated to be provided to the user. In one embodiment, the evaluation is performed in real-time or substantially real-time. Beneficially, real-time processing enables the payment or a portion thereof to be accomplished/achieved relatively quickly. In one embodiment and in this context, "relatively quickly" means on the same day that the insurance payment claim message is received. This is advantageous because typical two-party check situations today may take several days or longer before the check is able to be cashed by the insured. As mentioned above, the disposition circuit 306 may include authority to evaluate and make a final disposition regarding the claim (e.g., pay it out, pay it out partially) because the disposition circuit 306 is operated under the authority of the lending institution 140, which may be a designated party on the multi-party check. In other configurations where the multiple party insurance claim processing circuit 160 is not operated under the authority of the other party designated on the two-party check, the multiple party insurance claim processing circuit 160 may serve as conduit to send and receive messages from the designated party (i.e., lending institution 140) to in turn enable disbursement, at least partially, of the claim amount.

The disposition circuit 306 may utilize a variety of factors to evaluate the insurance claim payment request. Thus, the disposition circuit 306 may include one or more algorithms, processes, formulas, and the like that guide the evaluation process. For example, in one embodiment, the disposition circuit 306 evaluates the insurance claim payment request solely on information regarding the insured stored in the accounts database 146 (i.e., not included in the insurance claim payment message). In this regard, the disposition circuit 306 may examine various information to determine if there has been or potentially has been fraudulent activity associated with the insured (e.g., instances of where the insured lied). If yes, the disposition circuit 306 may withhold or only release a partial amount of the full claim amount. As another example, the disposition circuit 306 may evaluate the insurance claim payment based on information solely contained the insurance claim payment message. In one example embodiment, the disposition circuit 306 may examine the information for correctness to, e.g., make sure information provided appears right (e.g., the date of the incident may have been incorrectly entered as a future date).

If one or more pieces of information appears incorrect, the disposition circuit 306 may cause a message to be provided to the user (or submitting party), may cause a final disposition that withholds an amount of the payment amount, and/or a combination thereof. As still another example, the disposition circuit 306 may evaluate the claim based solely on or substantially solely on the insurance claim payment amount. Thus, those of ordinary skill in the art will appreciate the wide range of factors that may be used by the disposition circuit 306 to evaluate the insurance claim payment message.

As mentioned above and upon evaluation, the disposition circuit 306 may provide a final disposition message to at least one of the insurance company 130 and the user (via the communication circuit 310). The final disposition message is a notification that informs whether the insurance claim payment is authorized to be paid or if more information is needed, how much of the claim payment amount is authorized to be paid, when payment of the claim is likely, and any other accompanying information. When provided to the insurance company 130, the final disposition message may include, but is not limited to, an insurance policy number, an insurance claim number, an indication of the mortgagors of property, a name of the mortgage company, a mortgage loan number, an indication of the actual final disposition, a date of the final disposition, a description of the final disposition, a confirmation number, etc. In one embodiment and with respect to the client application 162, receipt of the final disposition message by the client application 162 may activate a GUI provided by the client application 162 to display the final disposition message. In this regard, there may be security protocol or other barriers that prevent the insured from accessing/viewing the final disposition message. For example, an icon on the GUI may be a selectable link that takes the insured to the message; however, the icon is grayed out/unable to be selected until the final disposition message is received by the client application 162. In this regard, the final disposition message may include an affirmative approval to the client application 162 to enable showing the message or parts thereof to the insured via the GUI.

As mentioned above, in some instances, a portion of the claim payment amount may be withheld as detailed in the final disposition message by the disposition circuit 306. Withholding of the funds may be due to a variety of factors. For example, one factor may be an evaluation of the insured. If the disposition circuit 306 determines that there is fraudulent activity associated with the insured, then the disposition circuit 306 may withhold a portion of the funds (e.g., 25% of the total claim amount is withheld). The withheld portion may be a predefined value.

In one embodiment, the disposition circuit 306 is structured to withhold a portion of the claim amount based on the amount of the claim. In this regard, the disposition circuit 306 may utilize a withhold threshold. In one example, the withhold threshold is $25,000. If the claim amount is $25,000 or below, the final disposition message provided by the disposition circuit 306 is that none of the claim amount is being withheld. However, if the claim amount is greater than $25,000, then the final disposition message provided by the disposition circuit 306 may be that a predefined percentage is being withheld. The predefined percentage may be a set number (e.g., 5%), variable based on the amount (e.g., 5% if the amount is between $25,001 and $30,000 and 3% if greater than $30,001, etc.), or another factor.

Of course, the amount withheld, when an amount is withheld, and factors used to determine the amount withheld are highly configurable and may vary from application-to-application. The aforementioned paragraphs are intended to show only a few examples and not be exhaustive. In this regard, the present disclosure contemplates many different types of factors that may be used to determine the amount withheld and when the amount is withheld, with all such possibilities intended to fall within the scope of the present disclosure.

In one embodiment and in regard to the remaining amount of the insurance claim payment amount, the disposition circuit 306 may allow the remaining amount or a portion of the remaining amount of the claim amount to be disbursed based on receiving one or more work progression values (also referred to herein as a work progression indicator, a work progress value or indicator, and a status indicator). The work progression value refers to an indication of repair work being performed, has been performed, or will be performed based on the insurance claim. Accordingly, the work progression value may include at least one of a quote regarding a to-be-performed service, an update of work being performed, and an invoice regarding work performed. In this regard and in many situations, property damage associated with an insurance claim requires ongoing work. In an effort to reduce fraudulent activity, the disposition circuit 306 may be structured to withhold a portion of the claim amount until at least one of the aforementioned work progression values are received. In one embodiment, the disposition circuit 306 may require the aforementioned work progression indicators to be received directly from the personnel doing or will-be-doing the work (i.e., a contractor). In this situation, the relevant personnel may download the multiple party insurance claim processing circuit client application 162 to his/her mobile device and along with providing identifying information regarding themselves and the associated insurance claim, the relevant personnel may upload the relevant work progress indicator: a copy of the quote provided, a bill for services, a picture showing the work being performed, etc. In this regard, a different GUI may be provided by the multiple party insurance claim processing circuit client application 162 for the contractor than for the user or insured. Nonetheless, by requiring a work progression indicator to be provided directly from the relevant personnel, the disposition circuit 306 may further avoid fraudulent activity being instituted by the insured (e.g., changing a quote amount). Further, the work progress indicator may ensure or substantially ensure that the work, which the claim payment is meant for, is actually being used for that work. In some situations, various confirmation processes may be included to confirm the identity of the person or entity providing the work progression indicator (e.g., that he/she is a contractor). In another embodiment, the work progression indicator may be received from the insured (e.g., via the GUI provided by the multiple party insurance claim processing circuit client application 162). In yet another embodiment, the work progression indicator may be received from either a contractor or other party doing the work or the insured. The demarcation of who is authorized to provide the work progression indicator may be highly configurable and change from application-to-application.

In one embodiment, the disposition circuit 306 may, via the client application 162, enable the insured or relevant personnel to obtain photos of the work being performed (i.e., the work progression value). However, the disposition circuit 306 may also command the location circuit of the user device to tag the photos with the approximate geographic location (e.g., latitude and longitude data). In this regard, the tagged location (i.e., the latitude and longitude data) may be used by the disposition circuit 306 to compare against the location of provided in the insurance claim payment message. If there is a discrepancy or substantial difference, the disposition circuit 306 may not release the remaining funds or a portion thereof. Accordingly, using location services may add an additional layer of security.

Upon receipt of the work progression indicator, the disbursement circuit 306 approves releasing of the funds remaining from the insurance claim payment message. In one embodiment, the released funds match the amount designated in the work progression indicator. For example, if a quote is for $5000, then the released funds are $5000 (assuming that the remaining portion is equal to or exceeding the quote). In an alternate embodiment, the disposition circuit 306 releases a percentage of the funds designated in the work progression indicator.

In other circumstances, the work progression indicator may not include a designated amount. For example, the work progression indicator may only include a picture or photograph of the repair work being performed on the damaged property. In this situation, the disposition circuit 306 may gradually release the funds in response to receiving these photographs. The funds may be released periodically (e.g., daily, weekly, etc.) and in equal or non-equal disbursements.

In this regard, the funds transfer circuit 308 is structured to facilitate or cause the disbursement of the insurance claim payment amount (or a partial amount) based on the final disposition message from the disposition circuit 306. For example, the funds transfer circuit 308 may provide a notification to the sending bank (i.e., the bank sending the funds on behalf of the insurance company 130) that the funds are approved for disbursement. In another example and when the multiple party insurance claim processing circuit 160 is a part of the sending financial institution, the funds transfer circuit 308 may directly cause the transfer to occur. In one embodiment, the funds transfer circuit 308 facilitates an electronic deposit. For example, during authorization of the insured, the insured may also provide a token. The token (e.g., email address, phone number, etc.) may be used to identity the person/entity to allow an electronic transfer. In other situations, the electronic transfer may include, but is not limited to, an ACH transfer, a wire transfer, etc. According to another embodiment, the funds transfer circuit 308 causes the creation of a check to be created and sent to the insured. In this instance, the check is only made out to the insured and is not a two-party check. Thus, those of ordinary skill in the art will appreciate the wide variety of funds transfer that are capable by the funds transfer circuit 308.

In the example of when funds are withheld, the funds transfer circuit 308 may be structured to create an escrow account. For example, the multiple party insurance claim processing circuit 160 may authorize the full claim amount to be disbursed; however, only a partial amount of that full amount is then authorized to go to the insured. In this case, the funds transfer circuit 308 may create an escrow account that holds the remaining funds amount. In this example, the funds transfer circuit 308 may include an accounts database (like the accounts database 146) for creation, recordkeeping, and searching for all the escrow accounts created/managed by the funds transfer circuit 308.

The communication circuit 310 may be structured to communicate with one or more devices. The communication circuit 310 may be unnecessary in this configuration due to the multiple party insurance claim processing circuit 160 being implemented with the lending institution computing system 142, such that the communication capabilities are provided therewith via the network interface 145. However, in other embodiments (e.g., when the multiple party insurance claim processing circuit 160 is a standalone system), the communication circuit 310 may enable the communicable coupling with the user device 110, insurance company computing system 132, lending institution computing system 142, financial institution computing system 152, and any other relevant devices over the network 102. Thus, in this configuration, the communication circuit 310 may include any type communication circuitry including, but not limited to, any of a cellular transceiver (e.g., CDMA, GSM, LTE, etc.), a wireless network transceiver (e.g., 802.11X, ZigBee, Bluetooth, etc.), a wired transceiver, and/or a combination thereof (e.g., both a cellular transceiver and a Bluetooth transceiver). Further, the communication circuit 310 may include cryptography or encryption functionalities that may be used to secure or relatively secure a communication channel between or among the communicating devices.

Upon facilitating full or partial disbursement of the claim amount, the multiple party insurance claim processing circuit 160 may receive a confirmation message. When the multiple party insurance claim processing circuit 160 is a separate component from the other components (e.g., the lending institution 140), the multiple party insurance claim processing circuit 160 may provide, via the communication circuit 310, a confirmation to those components to close the loop on this insurance claim. Information included in the confirmation message may include, but is not limited to, an insurance policy number, an insurance claim number, a confirmation number from the lending institution, a name of the user/insured, an indication of an amount of payment made, an indication of the payment type (e.g., check, electronic transfer, etc.), a date the payment was sent, and the like.

Figure 4:
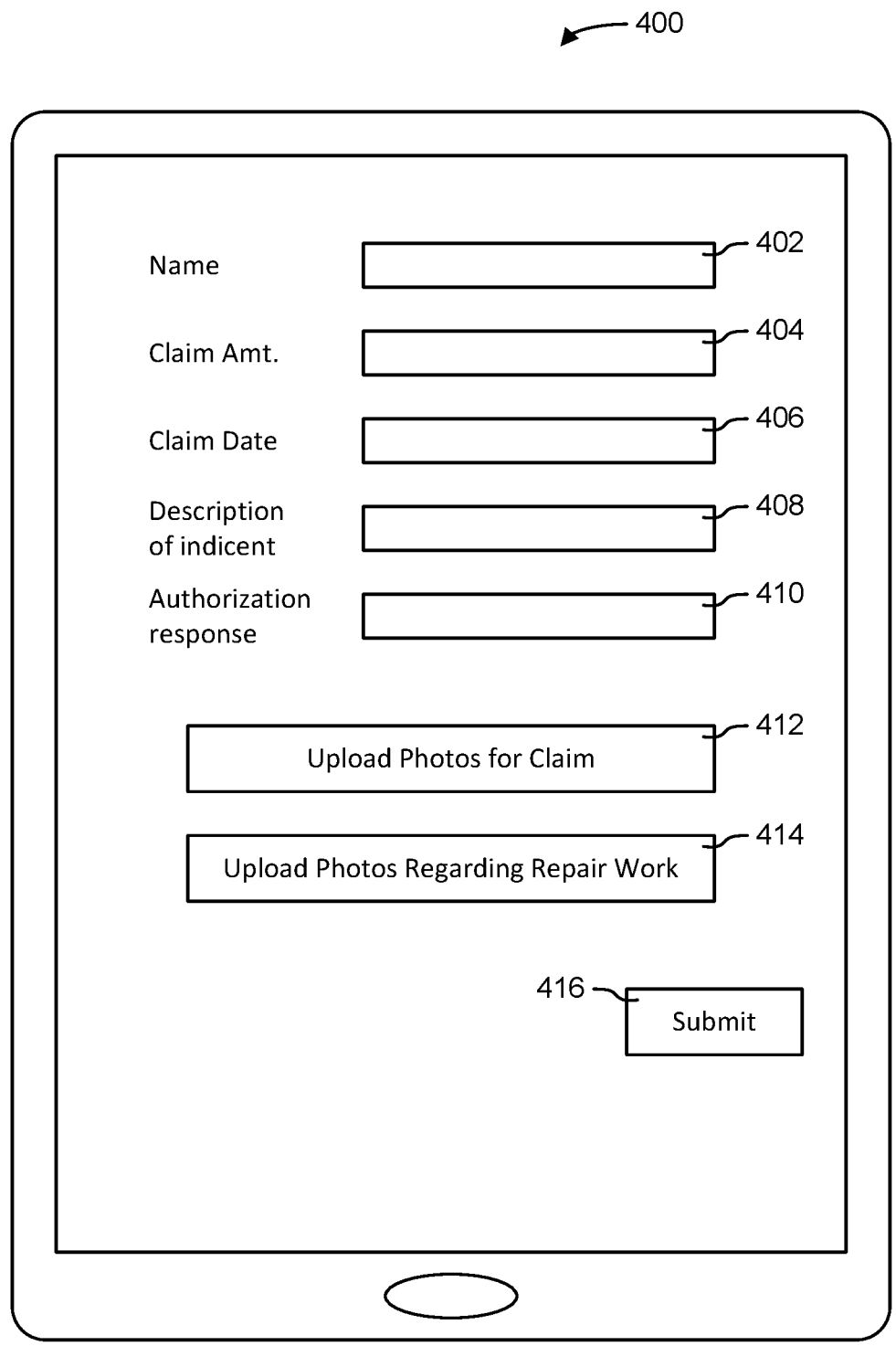
FIG. 4 is a graphical user interface provide by the multiple party insurance claim processing circuit, according to an example embodiment.

As mentioned above, the multiple party insurance claim processing circuit client application 162 may provide a GUI, which is supported or provided, at least in part, by the multiple party insurance claim processing circuit 160. Accordingly, referring now to FIG. 4, an example graphical user interface provided by the multiple party insurance claim processing circuit is depicted, according to an example embodiment. As shown, the GUI 400 is provided on the user device 110. While many fields/options are possible of being shown, the GUI 400 is shown to include a name field 402, a claim amount field 404, a claim date field 406, a description of the claim field 408, an authorization response field 410, an upload photos for claim button 412, an upload photos for repair work button 414, and a submit button 416. Fields 402-408 and 412 represent claim-related information fields, field 410 represents the optional identity verification field (as described above), while button 414 represents a button useable in facilitate partial disbursements. In other configurations, more, less, and/or different buttons and editable fields may be used. Further, additional screens may also be provided. Thus, FIG. 4 is only intended to show one example implementation and not meant to be limiting as many other example implementations are possible.

Based on the foregoing, an example use case with a physical multi-party check may be described as follows. A tornado causes damage to an insured's home. The insured contacts their insurance company, who sends an agent to assess the damage. The agent approves the claim on the spot and provides the insured with a multi-party check designating the insured and the insured's mortgage company as the recipient. The insured takes the check to their bank. At the bank, the banker accesses the multiple party insurance claim processing circuit client application 162 and enters information regarding the claim and the claim amount. The client application 162 provides the information to the circuit 160. In one embodiment, the circuit 160 identifies the insured and sends an authorization request. In another embodiment, the circuit 160 does not send an authorization request. Upon receiving a response to the authorization request (if sent) or concurrently, the circuit 160 evaluates the claim and makes a final disposition. The final disposition indicates whether the full or partial amount is allowed to be released. The final disposition may be provided to the client application 162 in real-time or in a short time frame from being submitted by the banker (e.g., within a day), such that the insured may gain access to the funds very quickly, which is in contrast to a typical process that currently exists.

Another example use case is using an electronic deposit, as compared to a physical check. In this case, the insurance agent may send the electronic deposit directly to the multiple party insurance claim processing circuit 160 (e.g., via a GUI provided by the client application 162). Thus, and in contrast to typical operation, a two-party check is not needed or used. Upon reception of the electronic deposit, processing may be analogous to that described above.

Accordingly and based on the above, four general scenarios exist. First, a multi-party check may be issued and presented or provided to the multiple party insurance claim processing circuit 160, wherein the circuit 160 facilitates a full disbursement of the designated claim amount. Second, a multi-party check may be issued and presented or provided to the multiple party insurance claim processing circuit 160, wherein the circuit 160 facilitates a partial disbursement of the designated claim amount. These scenarios correspond with the insurance company 130 creating a multi-party check to pay a claim as opposed to an electronic transfer (e.g., electronic deposit). Third, the multiple party insurance claim processing circuit 160 may receive an electronic deposit for an insurance claim, wherein the circuit 160 facilitates a full disbursement of the designated claim amount. Fourth, the multiple party insurance claim processing circuit 160 may receive an electronic deposit for an insurance claim, wherein the circuit 160 facilitates a partial disbursement of the designated claim amount. These latter scenarios correspond with an electronic insurance payment claim process, which beneficially may exclude the use of a two-party check. This is in contrast to the current handling of the situation where an insured, who has a loan on an object, makes an insurance claim regarding the object and the insurance company by default issues a two-party check to the lender and the insured. Explanation of these scenarios may be further explained with regard to FIGS. 5A-6B, whereby method 500 of FIG. 5A represents the first scenario, method 550 of FIG. 5B represents the second scenario, method 600 of FIG. 6A represents the third scenario, and method 650 of FIG. 6B represents the fourth scenario.

Because methods 500, 550, 600, and 650 may be implemented by the multiple party insurance claim processing claim circuit 160, reference may be to the circuit 160 to aid explanation of the methods 500, 550, 600 and 650.

Figure 5A:
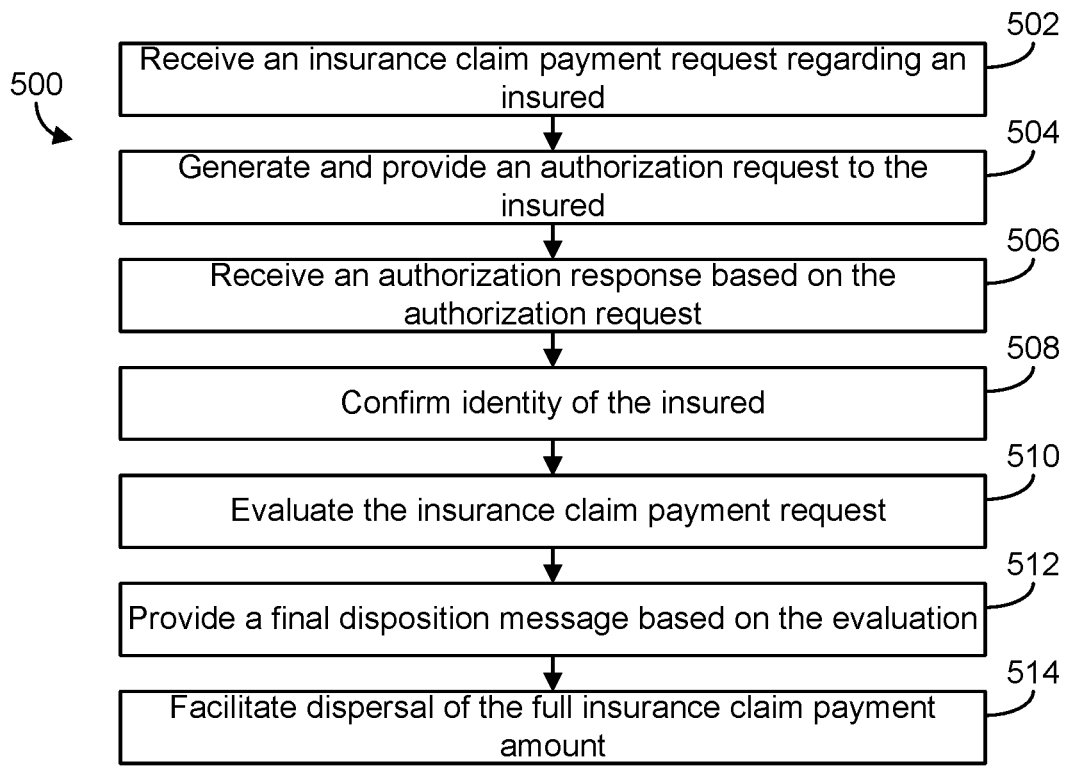
FIG. 5A is a flow diagram of a method of processing an insurance claim payout, according to an example embodiment.
Figure 5B:
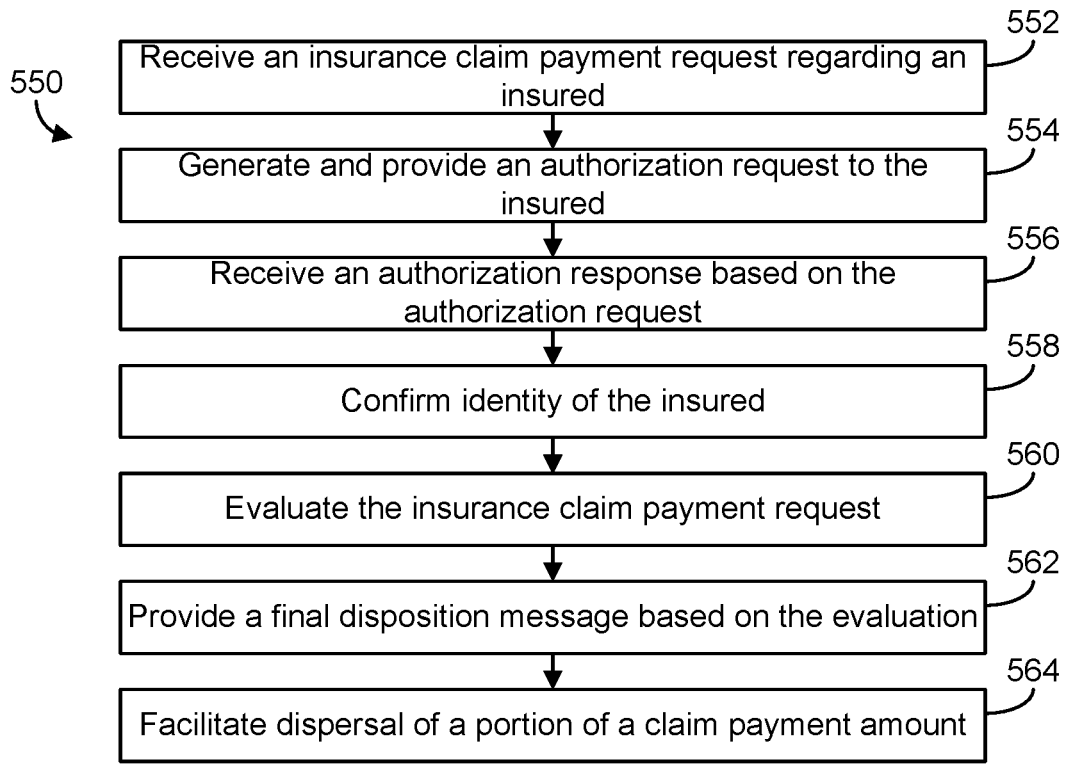
FIG. 5B is a flow diagram of a method of processing an insurance claim payout, according to another example embodiment.
Figures 6A, 6B:
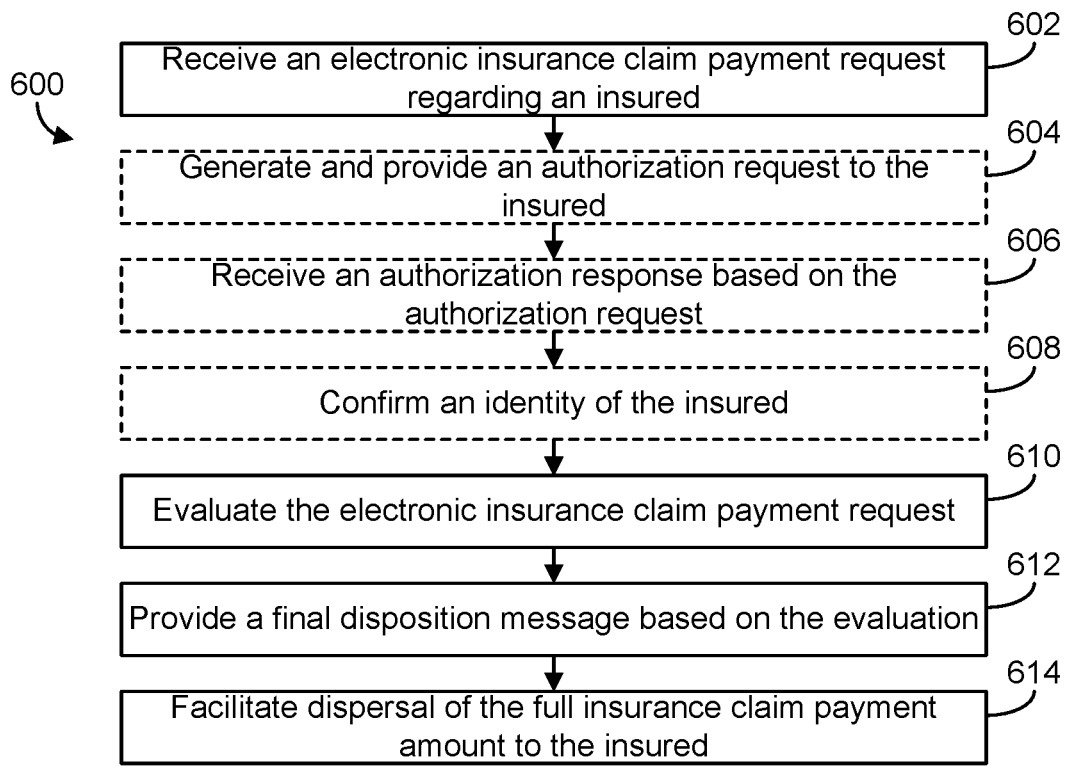
FIG. 6A is a flow diagram of a method of processing an insurance claim payout, according to still another example embodiment.
FIG. 6B is a flow diagram of a method of processing an insurance claim payout, according to yet another example embodiment.

Referring collectively to FIGS. 5A-5B, a flow diagram of a method of disbursing a full insurance claim amount (method 500 of FIG. 5A) and a partial insurance claim amount (method 550 of FIG. 5B) is shown, according to an example embodiment. Because methods 500 and 550 are substantially similar, the first steps are described collectively. Methods 500 and 550 are characterized by the insurance company providing the insured with a physical multi-party check. Accordingly, pre-cursors to the first processes of methods 500 and 550 are the insurance company agent analyzing a claim, approving the claim, determining an amount to payout the claim, creating/writing out the multi-party check, and giving the multi-party check to the insured (i.e. user 101). In the example described below, the multi-party check designates the insured and the lending institution as the recipients of the claim payment amount.

Based on the foregoing, at processes 502 and 552, an insurance claim payment request is received. As mentioned above, the insurance claim payment request refers to an authorization to pay the claim and may include information relating to the multi-party check itself as well as any claim-related information. In this example, a representative of a banking entity (e.g., financial institution 150) may be operating the multiple party insurance claim processing circuit client application 162 provided by the multiple party insurance claim processing circuit 160. In this example, the banking entity representative cannot endorse the multi-party check to enable the claim payment amount to be disbursed to the insured. However, even in the situation where a representative of the lending entity was entering information regarding the multi-party check (i.e., processes 502 and 552), the lending institution representative may not be authorized to endorse the check. Accordingly, in each situation, processing of the claim can take a considerable amount of time before money is actually disbursed to the insured. In contrast, via the client application 162, the representative may enter information regarding the multi-party check itself as well as any claim-related information, which are both described herein above. This information is received then directly by the multiple party insurance claim processing circuit 160. Using the information, the multiple party insurance claim processing circuit identifies the insured and generates and provides an authorization request to the claimant (processes 504 and 554). At processes 506 and 556, an authorization response is received. As mentioned above, the authorization request may be used to confirm the identity of the insured. Further, the authorization response may be determined based on one or more factors regarding the insurance claim payment request (e.g., amount, factors regarding the insured, a combination, etc.). For example, if the amount is above a certain high amount threshold, the authorization request may inform the insured that he/she must provide a biometric input. At processes 508 and 558, the identity of the insured is confirmed based on the authorization response. In regard to the aforementioned biometric example, the multiple party insurance claim processing circuit 160 may cross-reference the received biometric input (fingerprint) with the biometric input stored in the accounts database 146 regarding the insured to determine a match.

At processes 510 and 560, the insurance claim payment request is evaluated. As mentioned above, the multiple party insurance claim processing circuit 160 may evaluate the insurance claim payment request to determine whether the full amount is authorized to be disbursed, only a partial amount is authorized to be disbursed, and whether additional information is required for processing. Thus, evaluation may include examining whether any fraudulent activity is associated with the insured. Evaluation may also include an analysis of the claim amount relative to a withholding amount threshold (e.g., an amount above the withhold amount threshold may be flagged for withholding at least some funds, or may automatically result in the withholding of some funds, etc.).

At processes 512 and 562, a final disposition message is provided. As mentioned above, the final disposition message refers to an authorization to pay the full amount, a partial claim amount, or that more information is required. The final disposition message may be provided by the circuit 160 to the client application 162 to display to the, in this example, banker who is working with the insured. In another example, the final disposition message may be provided to the user as well. For example, using the user/insured's contact information, the message may be provided via a text message, email message, phone message, etc.

At this point, processes 500 and 550 diverge. In regard to process 500, at process 514, the full claim amount is provided or facilitated to be provided to the insured. In this regard, the client application 162 based on an instruction from the circuit 160 may instruct the banker to instruct the insured to sign the check. The banker may then take the multi-party check, credit the insured's account, and forward the check to deposit processing. A confirmation may then be sent by the circuit 160 to the insurance company and to the insured for recordkeeping (e.g., an email message).

In comparison, at process 564, a partial claim amount is provided or facilitated to be provided to the insured (e.g., by the funds transfer circuit 308). In this regard, the final disposition message may have indicated that only a partial amount should be disbursed. As mentioned herein above, the multiple party insurance claim processing circuit 160 may utilize a variety of factors to control how much is withheld, when the withheld portion is released, and how much is released. For example, the multiple party insurance claim processing circuit 160 may require an approved personnel to submit one or more work progression values before releasing at least a portion of the withheld amount. In one embodiment, the multiple party insurance claim processing circuit 160 may create an escrow account that holds or otherwise stores the withheld amount. Nonetheless and like in process 514, the client application 162, based on an instruction from the circuit 160, may instruct the banker to instruct the insured to sign the check. The banker may then take the multi-party check, credit the insured's accounts, and forward the check to deposit processing. A confirmation may then be sent by the circuit 160 to the insurance company and to the insured for recordkeeping (e.g., an email message).

Referring now FIGS. 6A-6B, a flow diagram of methods of disbursing a full insurance claim amount (method 600 of FIG. 6A) and a partial insurance claim amount (method 650 of FIG. 6B) based on receiving an electronic claim submission are shown, according to an example embodiment. Because methods 600 and 650 are substantially similar, the first steps are described collectively. Methods 600 and 650 are characterized by the insurance company providing an electronic insurance claim payment message directly to the multiple party insurance claim processing circuit 160 (e.g., via the client application 162). Thus, in this instance, the use and providing of a physical multi-party check is avoided/unneeded. Accordingly, pre-cursors to the first processes of methods 600 and 650 are the insurance company agent analyzing a claim, approving the claim, and determining an amount to payout the claim.

At processes 602 and 652, an electronic insurance claim payment message is received. The electronic payment message may indicate that the insurance company has agreed to pay out the claim, the amount agreed to pay (i.e., the claim amount), and any other information regarding the claim. To enable a complete or near complete electronic claim process, the electronic insurance claim payment message may also include payment information regarding the insured. For example, payment information may include a payment token, whereby the payment token may be used to identify and transfer funds to the insured (e.g., via CLEARXCHANGE, ZELLE, etc.). As another example, payment information may include an account number and/or routing number that indicates the receiving account for funds.

Using the information contained in the electronic insurance claim payment message, the multiple party insurance claim processing circuit identifies the insured, generates, and provides an authorization request to the insured (processes 604 and 654). At processes 606 and 656, an authorization response is received. At processes 608 and 658, the identity of the insured is confirmed based on the authorization response. These processes may be analogous to, e.g., processes 504, 506, and 508 described herein. It should be understood that these processes are optional in each of methods 600 and 650. Thus, in certain embodiments, processes 604, 606, and 608 (and processes 654, 656, and 658) may be excluded. Exclusion of these processes may facilitate even faster dispersal of the claim amount or a portion thereof to the insured. Determination of when these processes are included or excluded is highly configurable. In one configuration, these processes are included if the claim amount is above a threshold value (e.g., $25,000). If the claim amount is below the threshold value and to facilitate fast processing, these processes may be excluded.

At processes 610 and 660, the electronic insurance claim payment is evaluated. As mentioned above, the multiple party insurance claim processing circuit 160 may evaluate the claim to determine whether the full amount is authorized to be disbursed, only a partial amount is authorized to be disbursed, and whether additional information is required for processing. At processes 612 and 662, a final disposition message is provided. As mentioned above, the final disposition message refers to an authorization to pay the full amount, a partial claim amount, or that more information is required. Process 610, 612, 660, and 662 may be analogous to processes 510, 512, 550 and 552.

At this point, processes 600 and 650 diverge. In regard to process 600, at process 614, the full claim amount is provided or facilitated to be provided to the insured (e.g., by the funds transfer circuit 308) However and relative to process 500, here, the payment information provided in process 602 and 652 may be used to facilitate an electronic dispersal of funds to the insured. For example, the multiple party insurance claim processing circuit 160 may facilitate a funds transfer using the payment token. The electronic fund transfer may also include an ACH transfer, a wire transfer, and any other type of electronic fund transfer. In an alternate embodiment, the multiple party insurance claim processing circuit 160 may cause the creation of a physical check to be created and sent to the insured. For example, the multiple party insurance claim processing circuit 160 may instruct the financial institution 150 (or source banking entity for the insurance company 130) to create and send a check to the insured.

In comparison, at process 664, a partial claim amount is provided or facilitated to be provided to the insured. In this regard, the final disposition message may have indicated that only a partial amount should be disbursed. As mentioned herein above, the multiple party insurance claim processing circuit 160 may utilize a variety of factors to control how much is withheld, when the withheld portion is released, and how much is released. For example, the multiple party insurance claim processing circuit 160 may require approved personnel to submit one or more work progression values before releasing at least a portion of the withheld amount (e.g., provide a quote, a bill for services, etc.). Thus, process 664 may enable the multiple party insurance claim processing circuit 160 to monitor work or repairs being done/performed on the insured object. In one embodiment and similar to process 554, the multiple party insurance claim processing circuit 160 may create an escrow account that holds or otherwise stores the withheld amount. A confirmation message may then be sent by the circuit 160 to the insurance company and to the insured for recordkeeping (e.g., an email message). Similar to process 614, the funds may be disbursed or caused to be disbursed electronically. For example, an ACH funds transfer process, a wire transfer, and the like may be used to transfer funds to the insured. Alternatively, a check may be caused to be created and sent to the insured.

In contrast to a typical two-party check situation, in regard to methods 600 and 650, the two-party check is avoided entirely. Further, the insured may not even need to travel to a physical location of their banking and/or lending entity. This may save time for the insured, which in turn creates a more pleasant experience when processing insurance claim payouts.

Figure 7:
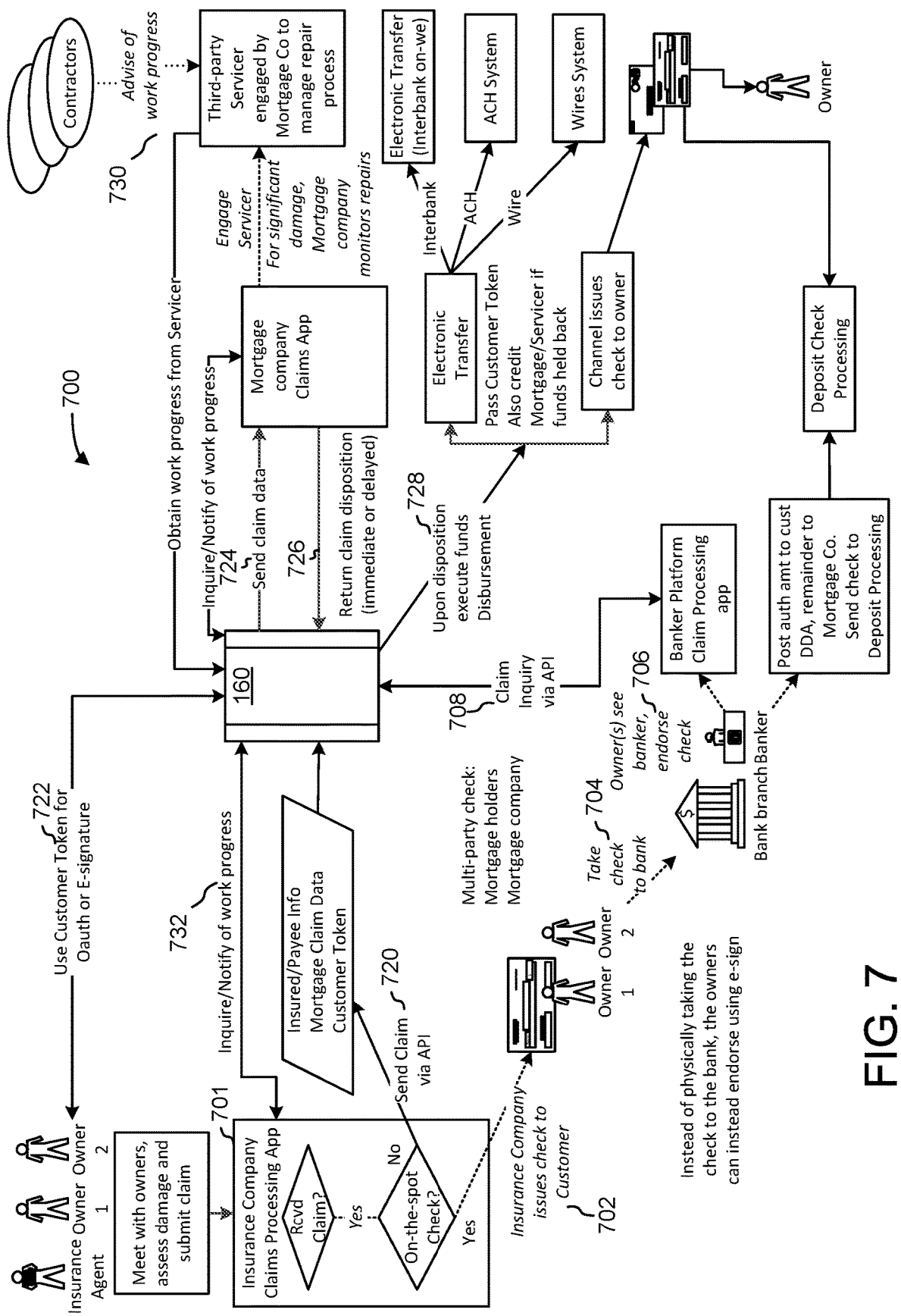
FIG. 7 is a process diagram for processing an insurance claim payout, according to still another example embodiment.

Referring now to FIG. 7, a flow diagram of processing multiple party insurance claim payout is shown, according to an example embodiment. Method 700 may be substantially similar to methods 500, 550, 600, and 650 except that method 700 is more detailed and shows how each entity may act/function during the processing of the multiple party insurance claim payout. Further, method 700 represents how the multiple party insurance claim processing circuit 160 may function in practice when either a physical multi-party check or electronic insurance payment request are utilized. In the example of method 700, the multiple party insurance claim processing circuit 160 is an intermediary to each of the lending institution (i.e., mortgage company), banking institution, and insurance company. Further, in the example of FIG. 7, the insured object is a home. However and as mentioned above, this depiction is not meant to be limiting as the present disclosure is applicable with other insured objects (e.g., automobiles, etc.), whereby method 700 may be applicable with those objects as well. With the above in mind, an explanation of method 700 may be described as follows.

Before turning to the electronic insurance claim payment request process or the physical multi-party check insurance claim payment request process of method 700 and before process 701, an incident occurred that results in property damage to the home. The home is owned by two owners: owner 1 and owner 1. As a result of the property damage, an insurance agent visits the home to assess the damage and then submits a claim. Accordingly, at process 701, an insurance claim is analyzed. In the example shown, an insurance claim processing application (e.g., provided by the claim processing circuit 134) is separate from the multiple party insurance claim processing circuit 160. Of course, in other embodiments, the circuit 160 may provide an SDK to integrate with the insurance claims processing application. After analysis of the insurance, the insurance claims processing application may either provide or cause to provide a multi-party check to the owners or an electronic deposit request.

First, in regard to the multi-party check scenario, at process 702, the multi-party check is issued to the owners (i.e., owner 1 and owner 2). The owners take the check to the bank (704). The owners endorse the check in front of the banker (or another representative at the bank)(706). At this point, the insurance claim payment request is provided to the multiple party insurance claim processing circuit 160 (708). In this configuration, insurance claim payment request is entered by the banker either into a banker platform claim processing application (which is a separate application relative to the client application 162). However, in another example and as described herein, the banker may utilize the client application 162 to GUI to enter the information. Before turning to the remaining processes as they similar to those of the electronic insurance payment request part of method 700, the initial steps of the electronic insurance payment request process are firstly described.

Accordingly, second, in regard to the electronic insurance payment request and rather than issuing a physical multi-party check to the owners, the insurance claim processing application may provide the electronic insurance payment request to the multiple party insurance claim processing circuit (process 720). As mentioned above, the electronic insurance payment request may be a request to allow payment of the insurance claim by authorizing the funds provided by the insurance company to be released to the owners. In this regard, the electronic insurance payment request may include insured/payee information, mortgage claim data, and a customer token. The customer token may be used to authenticate the owners and/or to enable an electronic funds transfer to the owners.

In this example and because the owners are not physically present in front of the banker to perform various identification/verification processes, at process 722, an authorization request is provided and an authorization response is received. More particularly, here, the customer token may be used to authenticate the owners. Such a process acts as a safeguard when electronic payment requests are utilized.

At this point, each of the parts of method 700 may take a similar path. However, in this configuration, the multiple party insurance claim processing circuit 160 may be a separate entity relative to the mortgage company. As such, the circuit 160 may act as a conduit or intermediary between the components and may not evaluate any insurance claim payment requests or, in another configuration, may evaluate only some of the insurance claim payment requests. For example, if the claim amount is less than $25,000 (an automatic processing threshold amount), then the circuit 160 may be authorized to evaluate and process the claim. However, for claim amounts above this threshold, the mortgage company may evaluate the claim.

Because the circuit 160 is not evaluating the insurance claim payment request in this embodiment, at process 724, insurance claim payment data is provided to the mortgage company claims application. The mortgage company claims application may evaluate the claim (using the same or similar factors as described above with respect to the circuit 160) and then provide a final disposition message, which is received by the circuit 160 (726). Upon receiving the final disposition message, the circuit 160 may facilitate funds disbursement (728). As shown, the funds transfer may be an electronic funds transfer using the customer's token (e.g., wire funds transfer, etc.) or may be the creating and sending of an actual check to the owners.

As shown and in one embodiment, only a partial amount of the claim amount may be disbursed. The remainder may be released as service/work is done to repair the damage to the home. Beneficially, this enables monitoring of the work progress to avoid or reduce the likelihood of insurance fraud. This is shown generally at process 730, where the mortgage company (or mortgage company claims application) engages a servicer (e.g., contract) to perform repair work. In this regard and for large claims, the mortgage company may have a desire to monitor the repair work. Of course, in another embodiment, the owners may engage the servicer. In either configuration, work updates may be required to be provided before a disposition message is provided (726) to disburse at least a portion of the remaining funds to the owners. In some instances, the circuit 160 may also provide updates/notifications to the insurance company (e.g., via the insurance company claims processing application)(732).

Figure 8:
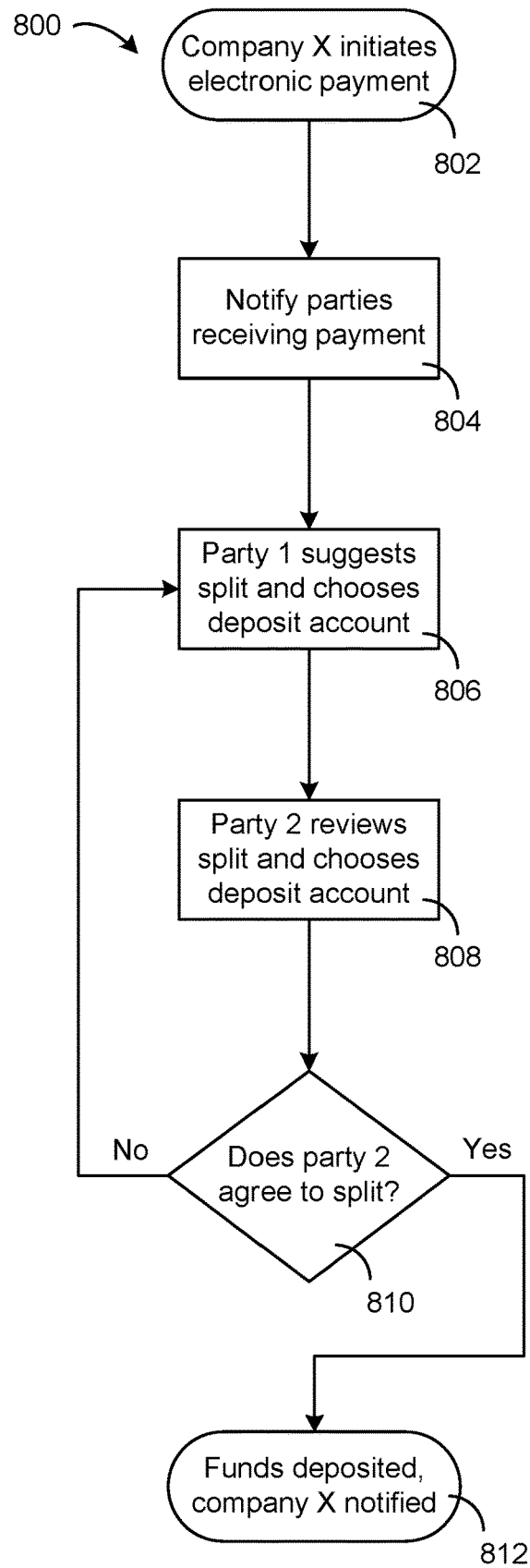
FIG. 8 is a flow diagram of a method of processing an insurance claim payout, according to yet another example embodiment.

Referring now to FIG. 8, a flow diagram describing a method to payout a multi-party insurance claim electronically is shown, according to an exemplary embodiment. Flow diagram 800 depicts a scenario where two parties (or more) may receive funds as part of a single insurance claim payout. For example, consider a scenario in which a tornado causes significant damage to a home that is owned by two different people. The method described below allows both home owners to receive their agreed-to respective portion of the insurance claim payout for damage caused by the tornado quickly and easily.

At process 802, an electronic claim payout is initiated. The payout may be initiated by an insurance company or another company such as a third-party servicer. In one embodiment, multiple party insurance claim processing circuit 160 receives a payment request from insurance company computing system 132. A mobile, web-based, or other type of application that may be owned by or associated with the insurance company or by a third party such as multiple party insurance claim processing circuit client application 162 can be provided by circuit 160 to process the electronic payout. Application 162 may be accessed via a variety of user devices 110.

At process 804, a notification is provided. In particular, at process 804, the multiple party insurance claim processing circuit 160 notifies the parties involved in the claim after the payout process is initiated. The notification may be sent via e-mail, text message, push notification, or any other method of electronic communication. Referring back to the example above, both owners of the home damaged by the tornado receiving funds as part of the insurance claim payout can receive a notification on one or more user devices 110.

At process 806, the first party may review the insurance claim payout. For example, one of the owners of the home damaged by the tornado may access client application 162 on a user device 110 and accept the claim payout and choose a deposit account, or propose a fund split that can be sent to the second owner of the home. The client application 162 can be configured to provide an interface such as GUI 400 on a user device 110 in order for the first party to review the claim payout. The information entered or provided by the first party at process 806 may include authorization information such as a passcode or biometric information that may be generated and processed by a circuit such as authorization circuit 304. Such information may be cross-referenced by, e.g., the multiple party insurance claim processing circuit 160 to verify the identity of the party. Beneficially, such a process may reduce the fraud risk that an unauthorized user who is operating the user device associated with the first party accepts or rejects the insurance claim payout At process 808, the second party may review the insurance claim payout. For example, the second owner of the home damaged by a tornado can access the client application 162 on a user device 110 to review the proposed fund split by the first owner and choose a deposit account for their portion of the fund split. The second owner can use a GUI 400 on a user device 110 to review the payout and submit authorization information. As mentioned above, authorization information can be generated and processed by an authorization circuit 804 and can include a passcode or biometric information. A similar process as described with the first party may be utilized.

At process, the response to the fund split decision made by the second party is received. If the second owner of the home does not accept the fund split proposed by the first owner, for example, circuit 160 via client application 162 may notify the first owner and request a new fund split proposal. The first owner may again access client application 162 with a user device 110 and use a GUI 400 to enter a new fund split proposal. The payout process may not be completed until both parties agree on a fund split.

Flow diagram 800 ends at process 812 when both parties agree to a fund split. In turn, the funds are deposited in their agreed-to amounts to each designated deposit account of each party. Subsequently or concurrently, a final disposition message may be sent via the circuit 160 (e.g., to the parties, the insurance company, the servicer, etc.). As mentioned above, circuit 160 may include various circuits within such as authorization circuit 304, disposition circuit 306, and funds transfer circuit 308. In some embodiments, the payout may be dependent on a work progress indicator such as described above with respect to FIG. 3. As an example, the two owners of a home damaged by a tornado can agree to split the claim payout in half. After the split is agreed upon, an insurance company providing protection for the home can deposit funds into the accounts chosen by the homeowners. Once the deposit occurs, circuit 160 can send a final disposition message to the insurance company.

It should be understood that while method 800 is primarily described with respect to two parties (i.e., the two home owners), this description is not meant to be limiting. In other configurations, multiple parties (e.g., three, four, five, etc.) may be involved. For example, an insurance claim payout may be designated for four parties. In this case, a four-way agreed-to split may occur. Thus, those of ordinary skill in the art will readily recognize and appreciate the high configurability of this method without departing from the spirit and scope of the present disclosure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. An apparatus, comprising:
    a claim payment circuit structured to receive an insurance claim payment request from an insurance company computing system regarding a physical multiple party check based on an insurance claim regarding an insured entity, wherein the insurance claim payment request includes a claim amount;
    a disposition circuit structured to:
        evaluate the insurance claim payment request, and provide a final disposition message responsive to the evaluation, the final disposition message including an indication regarding an authorization to disburse a portion of funds of a claim amount designated in the insurance claim payment request,
        receive a work progress indicator directly from a contractor device that is operated by a contractor and not the insured entity, the work progress indicator comprising a photo regarding a repair of an insured object associated with the insurance claim payment request, wherein the disposition circuit commands the contractor device to tag photos with an approximate geographic location, such that the photo comprises tagged location data; and
        compare the tagged location data of the photo to a location provided in the insurance claim payment request to determine whether there is a discrepancy between the tagged location data and the location provided in the insurance claim payment request;
        wherein the provided disposition message activates a graphical user interface to display the final disposition message;
    an authorization circuit structured to determine that the claim amount is above a predetermined threshold and, in response to determining the claim amount is above a predetermined threshold, generate and provide an authorization request to a user device associated with the insured entity, the authorization request including a request to confirm the identity of the contractor and requiring a biometric input; and
    a fund transfer circuit structured to, in response to receiving the confirmation of the identity of the contractor, the biometric input from the user device, and determining there is no discrepancy between the tagged location data and the location provided in the insurance claim payment request, facilitate dispersal of the portion of funds to the insured entity responsive to the final disposition message, wherein the work progress indicator is received before generating and providing the final disposition message to instruct the funds transfer circuit to facilitate dispersal of at least a portion of the portion of funds.

2. The apparatus of claim 1, wherein responsive to receiving the biometric input, the authorization circuit is structured to confirm an identity of the insured entity; and
    wherein the authorization request includes a time duration before an expiration of the insurance claim payment request.

3. The apparatus of claim 2, wherein the authorization request further requests a passcode.

4. The apparatus of claim 1, wherein the evaluation is based on at least one of an indication of fraud regarding the insured entity and the claim amount.

5. The apparatus of claim 4, wherein responsive to the claim amount being below a threshold value, the portion of funds is equal to the claim amount, such that the funds transfer circuit is structured to facilitate dispersal of an entirety of the claim amount to the insured entity.

6. The apparatus of claim 5, wherein the threshold value is $25,000.

7. The apparatus of claim 4, wherein responsive to the claim amount being above a threshold value, the portion of funds is dispersed to the insured entity is less than the claim amount.

8. The apparatus of claim 1, wherein the portion of funds is less than the claim amount, such that only a partial amount of the claim amount is facilitated, by the funds transfer circuit, to be dispersed to the insured entity.

9. The apparatus of claim 8, wherein the funds transfer circuit is structured to create an escrow account for the portion of funds.

10. The apparatus of claim 1, wherein the work progress indicator further includes at least one of a quote for a repair to be performed and a bill for a repair performed.

11. The apparatus of claim 1, further comprising a communication circuit structured to provide the final disposition message to the insured entity and to an insurance company computing system.

12. A method, comprising:
   receiving, by a processing circuit, an electronic insurance claim payment request based on an insurance claim regarding an insured entity;
   evaluating, by the processing circuit, the electronic insurance claim payment request;
   receiving, by the processing circuit, a work progression indicator directly from a contractor device that is operated by a contractor and not the insured entity, the work progress indicator comprising a photo regarding a repair of an insured object associated with the insurance claim payment request, wherein the processing circuit commands the contractor device to tag photos with an approximate geographic location, such that the photo comprises tagged location data;
   comparing, by the processing circuit, the tagged location data of the photo to a location provided in the insurance claim payment request to determine whether there is a discrepancy between the tagged location data and the location provided in the insurance claim payment request;
   in response to determining a claim amount in the insurance claim payment request is above a predetermined threshold, generating and providing, by the processing circuit, an authorization request to a user device associated with the insured entity, the authorization request including a request to confirm the identity of the contractor and requiring a biometric input; and
   facilitating, by the processing circuit, in response to receiving the confirmation of the identity of the contractor and the biometric input and determining there is no discrepancy between the tagged location data and the location provided in the insurance claim payment request, a dispersal of an amount of funds based on the electronic insurance claim payment request to the insured entity.

13. The method of claim 12, wherein the amount of funds is less than a full claim amount designated in the electronic insurance claim payment request.

14. The method of claim 13, wherein the work progression indicator regarding the insurance claim is received before facilitating dispersal of the amount of funds to the insured entity.

15. The method of claim 14, wherein the work progression indicator further includes at least one of a quote for a repair to be performed and a bill for a repair performed.

16. The method of claim 12, wherein the dispersal of the amount of funds is provided to the insured entity within one day of receiving the electronic insurance claim payment request.

17. The method of claim 12, wherein the electronic insurance claim payment request includes an electronic deposit request.

18. The method of claim 12, wherein the processing circuit is structured to provide the amount of funds electronically to the insured entity.

19. A system, comprising:
   a multiple party insurance claim processing circuit comprising memory having instructions stored therein and at least one processor structured to execute the instructions to:
      receive an insurance claim payment request based on an insurance claim regarding an insured entity;
      evaluate the insurance claim payment request;
      receive a work progress indicator comprising a photo directly from a contractor device that is operated by a contractor and not the insured entity, the work progress indicator regarding a repair of an insured object associated with the insurance claim payment request, wherein the processing circuit commands the contractor device to tag photos with an approximate geographic location, such that the photo comprises tagged location data;
      compare the tagged location data of the photo to a location provided in the insurance claim payment request to determine whether there is a discrepancy between the tagged location data and the location provided in the insurance claim payment request;
      in response to determining a claim amount in the insurance claim payment request is above a predetermined threshold, generate and provide an authorization request to a user device associated with the insured entity, the authorization request including a request to confirm the identity of the contractor and requiring a biometric input; and
      in response to receiving and evaluating the work progress indicator, receiving the confirmation of the identity of the contractor, the biometric input, and determining there is no discrepancy between the tagged location data and the location provided in the insurance claim payment request, cause dispersal of an amount of funds based on the insurance claim payment request to the insured entity.

20. The system of claim 19, wherein insurance claim payment request includes an electronic deposit.

21. The system of claim 19, wherein the amount of funds is less than a full claim amount designated in the insurance claim payment request.

22. The system of claim 21, wherein the work progression indicator is received prior to causing dispersal of at least a portion of the amount of funds.

23. The system of claim 19, wherein the instructions include providing a message to a computing system associated with an insurance company responsive to causing the dispersal of the amount of funds.

24. The system of claim 19, wherein the dispersal of the amount of funds is provided to the insured entity within one day of receiving the electronic payment request.

\* \* \* \* \*